United States Patent
Braun et al.

(10) Patent No.: US 9,219,577 B2
(45) Date of Patent: Dec. 22, 2015

(54) METHOD FOR TRANSMISSION OF DATA IN A RADIO COMMUNICATION SYSTEM, FIRST NETWORK NODE AND SECOND NETWORK NODE THEREOF

(75) Inventors: Volker Braun, Stuttgart (DE); Uwe Doetsch, Freudental (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/813,562

(22) PCT Filed: May 31, 2011

(86) PCT No.: PCT/EP2011/058942
§ 371 (c)(1),
(2), (4) Date: Jan. 31, 2013

(87) PCT Pub. No.: WO2012/016727
PCT Pub. Date: Feb. 9, 2012

(65) Prior Publication Data
US 2013/0132788 A1    May 23, 2013

(30) Foreign Application Priority Data
Aug. 2, 2010   (EP) .................................... 10305854

(51) Int. Cl.
*H04L 1/18* (2006.01)
*H04L 1/08* (2006.01)
*H04L 1/00* (2006.01)

(52) U.S. Cl.
CPC ............... *H04L 1/08* (2013.01); *H04L 1/1819* (2013.01); *H04L 1/1896* (2013.01); *H04L 1/1809* (2013.01); *H04L 2001/0097* (2013.01)

(58) Field of Classification Search
USPC ................................................. 714/749, 774
See application file for complete search history.

(56) References Cited

U.S. PATENT DOCUMENTS

| | | | |
|---|---|---|---|
| 2006/0171347 A1* | 8/2006 | Attar et al. | 370/328 |
| 2007/0250638 A1* | 10/2007 | Kiran et al. | 709/236 |
| 2009/0010198 A1* | 1/2009 | Boariu et al. | 370/315 |
| 2009/0042511 A1* | 2/2009 | Malladi | 455/62 |
| 2009/0307559 A1* | 12/2009 | Wu et al. | 714/749 |
| 2010/0061287 A1 | 3/2010 | Josiam et al. | |

FOREIGN PATENT DOCUMENTS

| | | |
|---|---|---|
| CN | 101102174 | 1/2008 |
| EP | 1 635 516 A1 | 3/2006 |

(Continued)

OTHER PUBLICATIONS

International Search Report for PCT/EP2011/058942 dated Aug. 2, 2011.

(Continued)

Primary Examiner — M. Mujtaba K Chaudry
(74) Attorney, Agent, or Firm — Fay Sharpe LLP

(57) ABSTRACT

The invention relates to a method (MET1) for transmitting data from a first network node (BS) of a radio access network of a radio communication system to a second network node (MS) of the radio access network, and wherein the method (MET1) comprises the steps of transmitting (M1/6) a first negative acknowledgement (N1) from the second network node (MS), if the second network node (MS) cannot recover error free first data (D1), the first data (D1) being data from a single data source of the radio access network or for a single data sink of the radio access network, determining (M1/11) a combination (COMB1) of the first data (D1) and of at least second data (D2) by applying a superposition of the first data (D1) and the at least second data (D2), the at least second data (D2) being further data from the single data source or for the single data sink, and transmitting (M1/18) the combination (COMB1) to the second network node (MS). The method further relates to the first network node (BS) for use in the radio communication system and to the second network node (MS) for use in the radio communication system.

16 Claims, 9 Drawing Sheets

(56) References Cited

FOREIGN PATENT DOCUMENTS

| EP | 2 131 518 A2 | 12/2009 |
|---|---|---|
| JP | 2008-017487 | 1/2008 |
| JP | 2010-004186 | 1/2010 |
| WO | WO 2009/026695 | 3/2009 |
| WO | WO 2010/056067 | 5/2010 |

OTHER PUBLICATIONS

Japanese Office Action dated Mar. 4, 2014 (English translation attached).
Pu, Wei, et al., "Continuous Network Coding in Wireless Relay Networks", IEEE INFOCOM, 2008, pp. 2198-2206.
Larsson, Peter, et al., "Multi-User ARQ", IEEE, 2006, pp. 2052-2057.
Pages from European Search Report completed Feb. 9, 2011.
IEEE Standards, "Part 16: Air Interface for Fixed Broadband Wireless Access Systems", IEEE Std. 802.16-2004, Oct. 1, 2004.
IEEE Standards, "Part 11: Wireless LAN Medium Access Control (MAC) and Physical Layer (PHY) specifications", IEEE Std. 802.11g-2003, Jun. 12, 2003.
"$3^{rd}$ Generation Partnership Protect; Technical Specification Group Radio Access Network; Evolved Universal Terrestrial Radio Access (E-UTRA); Physical layer procedures (Release 9)", 3GPP TS 36.213 V9.2.0 (Jun. 2010) (relevant sections: chapter 7.1.7.1, chapter 10).

* cited by examiner

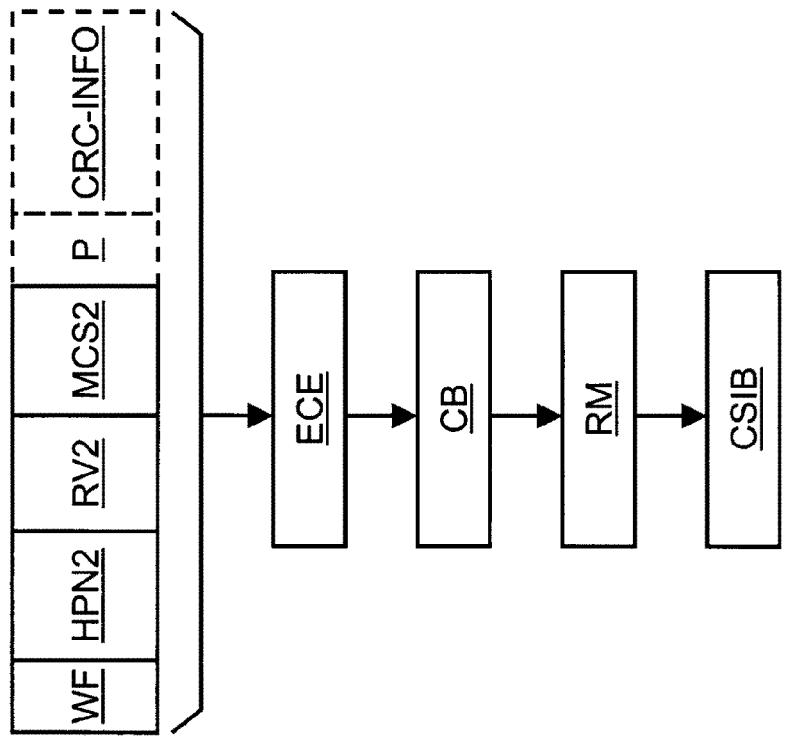
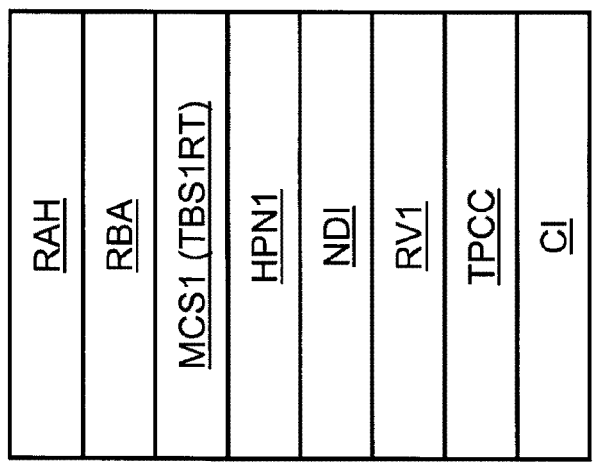
FIG. 7

METHOD FOR TRANSMISSION OF DATA IN A RADIO COMMUNICATION SYSTEM, FIRST NETWORK NODE AND SECOND NETWORK NODE THEREOF

FIELD OF THE INVENTION

The invention relates to wireless communications and, more particularly but not exclusively, to retransmission of data in wireless communications.

BACKGROUND

Different retransmission schemes have been developed for correcting transmission errors on a wireless link between a base station and a mobile station.

Using an automatic repeat request (ARQ=automatic repeat request) scheme, a transmitter adds cyclic redundancy check information (CRC=cyclic redundancy check) to data to be transmitted. A receiver can use the CRC information to detect an error in the received data. Depending on a detection of the error, the receiver sends a positive acknowledgement (ACK=acknowledgement) or a negative acknowledgement (NACK=negative acknowledgement) to the transmitter. The receiver does not store received data, which cannot be received error free. If the transmitter receives a NACK, the transmitter retransmits the data at least a second time.

A hybrid ARQ scheme (HARQ=hybrid ARQ) combines soft combining with the ARQ scheme. The soft combining avoids a discarding of an erroneously received data packet by storing the erroneously received data packet in a data buffer of the receiver. This allows retransmitting either the whole data packet in a same way with all information bits (denoted as chase combining) and with redundancy information by adding parity bits. The parity bits are calculated from the information bits using a specific coding scheme and a specific rate matching. Alternatively besides the parity bits, only a subset of the information bits or none of the information bits (denoted as incremental redundancy) are retransmitted.

A HARQ process comprises a first transmission of data and either a positive acknowledgement or one or more retransmissions of parity information for the data, if the first transmission is not acknowledged until one of the retransmissions is acknowledged or until a predefined number of retransmissions have been performed.

Usually, two or more HARQ processes are running simultaneously and each of the two or more HARQ process is related to transmitting and acknowledging a single protocol data unit. An identifier may be used for assigning positive and negative acknowledgements to the two or more HARQ processes. For instance, in LTE up to eight HARQ processes are running simultaneously on a terminal. Consequently, eight different identifiers of the HARQ processes are required. An identifier of a HARQ process may comprise an integer value, preferably in the range from 0 to 7.

In a cooperative uplink relaying scheme, a base station incorrectly receives a first data packet from a first mobile station and incorrectly receives a second data packet from a second mobile station, while a relay node between the mobile station and the base station correctly receives the first and the second data packet. The relay node performs network coding by combining a retransmission of the first data packet for the first mobile station and a retransmission of the second data packet for the second mobile station and transmits the combined retransmission to the base station.

In a multiuser ARQ scheme, a base station transmits a first data packet to a first mobile station and a second data packet to a second mobile station. The first mobile station may receive the first data packet incorrectly but may receive the second data packet correctly. Similarly, the second mobile station may receive the second data packet incorrectly but may receive the first data packet correctly. The base station performs network coding by combining a retransmission of the first data packet for the first mobile station and a retransmission of the second data packet for the second mobile station and multicasts or broadcasts the combined retransmission to the first and the second mobile station.

For the multiuser ARQ scheme, the first mobile station wastes electrical power, because it must also decode the second data packet destined for the second mobile station. Likewise, the second mobile station wastes electrical power, because it must also decode the first data packet destined for the first mobile station.

Furthermore, the multiuser ARQ scheme can be only applied, if the first mobile station correctly receives the second data packet and the combined retransmission of the first and the second data packet and if the second mobile station correctly receives the first data packet and the combined retransmission of the first and the second data packet.

The cooperative uplink relaying scheme and the multiuser ARQ scheme require data packets from or for at least two mobile stations. The radio conditions or the distribution of the mobile stations across a coverage area of a base station may not allow applying the cooperative uplink relaying scheme or the multiuser ARQ scheme all the time. Thereby, an amount of signaling data or an amount of user data for single retransmissions of user data may consume additional radio resources.

SUMMARY

The way of performing a retransmission of user data effects an amount of radio resources required for signalling information, effects an amount of radio resources required for the retransmissions, effects data handling at the transmitter and effects data handling at the receiver.

It is an object of the invention to provide an improved method for transmission of data from the transmitter to the receiver with a more effective usage of radio resources.

The object is achieved by a method for transmitting data from a first network node of a radio access network of a radio communication system to a second network node of the radio access network, wherein the method comprises the steps of transmitting a first negative acknowledgement from the second network node, if the second network node cannot recover error free first data, the first data being data from a single data source of the radio access network or for a single data sink of the radio access network, determining a combination of the first data and of at least second data by applying a superposition of the first data and the at least second data, the at least second data being further data from the single data source or for the single data sink, and transmitting the combination to the second network node.

The object is further achieved by a first network node for use in a radio communication system and by a second network node for use in a radio communication system. The first network node may be a base station, a relay station or a mobile station. Likewise, the second network node may be a mobile station, a relay station or a base station.

The method according to the present invention offers a first benefit of not requiring receiving data from a further data source of the radio access network or transmitting data to a further data sink of the radio access network for determining the combination of the first data and the at least second data.

This means, that the method can be applied, even if only one mobile station of mobile stations within a coverage area of a cell or sector of a base station has data for transmission or reception. This allows for more effectively using the radio resources and for reducing the energy consumption in the mobile station in comparison to the multiuser ARQ scheme.

The method offers a further benefit of reducing signalling information for different HARQ processes being responded from the receiver to the transmitter of the combination by providing for example a single NACK or a single ACK for the received combination.

The method offers an even further benefit of not requiring to correctly receive the first data in a previous transmission to be able to recover the first data and the at least second data by performing a soft combining of the first data of the previous transmission and the combination of the first data and the at least second data.

According to an embodiment of the invention, the combination is a retransmission for the first user data and a first transmission for the at least second user data and the method further comprises the steps of recovering the at least second data at the second network node by subtracting an estimate of the first data of at least one previous transmission from an estimate of the combination, and recovering the first data at the second network node by subtracting the recovered at least second data from the estimate of the combination. This provides an advantage of combining a retransmission for the first data with a first transmission of new user data as the at least second data and allows recovering the first data and the at least second data after a reception of the combined transmission of the first data and the at least second data.

In an alternative embodiment of the invention, the method further comprises the steps of transmitting at least a second negative acknowledgement from the second network node, if the second network node cannot recover error free the at least second data, recovering the at least second data at the second network node by subtracting an estimate of the first data of at least one previous transmission from an estimate of the combination, and recovering the first data at the second network node by subtracting an estimate of the at least second data of at least one previous transmission from the estimate of the combination or by subtracting the recovered at least second data from the estimate of the combination. This provides an advantage of combining a retransmission for the first data of the single data source or the single data sink with a retransmission for the at least second data of the single data source or the single data sink and allows recovering the first data and the at least second data after a reception of the combined transmission of the first data and the at least second data.

In a further embodiment of the invention, the determining step for the combination is applied, if the first negative acknowledgement and the at least one second negative acknowledgement are transmitted at the second network node within a predefined time interval and wherein an indication for the combined transmission is implicitly provided to the second network node by transmitting the first negative acknowledgement and the at least one second negative acknowledgement within the predefined time interval. The further embodiment of the invention allows avoiding signalling an indication to the second network node, that the retransmission is a combined retransmission of the first and the at least second data rather than being a single retransmission for the first or the at least second data. The further embodiment of the invention may further avoid signalling indications to the second network node, that the combined retransmission comprises the first data and the at least second data. A value of the predefined time interval may be adapted to quality of service parameters such a maximum transmission delay or a maximum delay jitter from the data source to the data sink.

In an even further embodiment of the invention, the method further comprises the step of switching between the combination being a retransmission for the first user data and the at least second user data and the combination being the retransmission for the first user data and the first transmission for the at least second data. This allows for flexibility in choosing either the combination being the retransmission for the first user data and the at least second user data and the combination being the retransmission for the first user data and the first transmission for the at least second data depending on a fill level of a buffer at the first network node, depending on a number of negative acknowledgements received previously and/or depending on current radio link quality.

In further embodiments of the invention, the superposition is a modulo 2 addition of the first data and the at least second data prior to modulation or the superposition is an addition of real amplitude values of the first data and the at least second data and an addition of imaginary amplitude values of the first data and the at least second data after the modulation and the first data and the least second data are modulated with a same modulation scheme or with different modulation schemes. This additionally allows for flexibly adapting the determination of the combination to capabilities of the second network node or to a quality parameter of a wireless link between the first and the second network node such as a level of a signal-to-noise ratio and further allows to independently adapt the modulation schemes of the first data and the at least second data. This further allows reducing signalling information for different HARQ processes to be transmitted from the transmitter to the receiver by using for example a same modulation scheme and/or a same coding scheme and/or a same redundancy version for the first data and the at least second data.

According to even further embodiments of the invention, the method further comprises the step of switching between the combination being the superposition of the first data and the at least second data and a combination being determined by multiplexing the first data with the at least second user data and/or the method further comprises the step of switching between the transmission of the combination of the first data and the at least second data and a single retransmission for the first data. Also these even further embodiments allow for flexibility in choosing either the combination being based on network coding or multiplexing or a single retransmission of the first data depending on a fill level of a buffer at the first network node, depending on a number of negative acknowledgements received previously and/or depending on current radio link quality.

In preferred embodiments of the invention, the method further comprises the step of multiplexing at least one physical layer processing parameter of the first data and/or the at least second data such as an indication of a modulation scheme, a coding scheme or a redundancy version to the combination of the first data and the at least second data. This provides the advantage of reducing signaling information on a signaling channel such as a downlink control channel used in HSDPA (HSDPA=High Speed Downlink Packet Access) or LTE by adding the signaling information to the combination of the first and the at least second data. Instead of loading the signaling channel, which often have been allocated limited radio resources given by a radio communication standard, with processing parameters of the first and/or the at least second data, signaling information according to the physical layer processing parameters of the first and/or the at least second data is loaded on a data channel, which is used for the transmission of the combination of the first and the at least second data.

According to a further preferred embodiment of the invention, the method further comprises the step of applying or adapting the transmission of the combination of the first and the at least second data depending on a quality of service class of the first data and/or the at least second data. This allows fulfilling quality of service requirements such as a maximum delay value or a maximum delay jitter for a transmission from the data source to the data sink. The transmission of the combination of the first data and the at least second data is preferably used for delay-insensitive services such as web browsing or file transfer and not used for services such as gaming or voice over IP. If for example a user stops gaming on a mobile device (being the second network node) and starts web browsing, the transmission of user data from the first network node to the second network node may be switched from the conventional single retransmission for first data to the transmission of the combination of the first data and the at least second data. This allows further for adapting the transmission of the combination of the first data and the at least second data depending on the parameters of the current quality of service by changing for example a modulation scheme of the first data and/or a modulation scheme of the at least second data and/or a coding scheme of the first data and/or a coding scheme of the at least second data.

If for example a user stops web browsing on the mobile device and starts a file transfer such as a video download, a link adaptation such as a coding scheme or a modulation scheme of the transmission of the combination of the first data and the at least second data from the first network node to the second network node may be adapted for example according to an allowed number of missing or defective video frames within a specific time or according to a residual block error rate.

In an even further preferred embodiment of the invention, the method further comprises the step of providing an indication for the transmission of the combination by the first network node to the second network node and wherein the transmission of the combination of the first data and the at least second data is provided by a third network node of the radio communication system. The even further preferred embodiment may be especially applied, when a relay station is used between a base station and a mobile station. The relay station may store the first data and the at least second data. If a retransmission of the first data or a retransmission of the first data and the at least second data is required, the relay station provides the combination of the first data and the at least second data to the second network node and the first network node such as the base station only provides the indication for the combination of the first data and the least second data to the second network node. Thereby, processing power at the base station can be reduced.

In further embodiments of the invention, the single data source is the first network node or a third network node of the radio access network or the single data sink is the second network node or the third network node. This allows applying the invention according to different transmission scenarios such as a downlink transmission between a base station and a mobile station, an uplink transmission between a mobile station and a base station, a downlink transmission between a base station and a relay station, a downlink transmission between a relay station and a mobile station, an uplink transmission between a mobile station and a relay station and an uplink transmission between a relay station and a base station.

Further advantageous features of the invention are defined and are described in the following detailed description of the invention.

BRIEF DESCRIPTION OF THE FIGURES

The embodiments of the invention will become apparent in the following detailed description and will be illustrated by accompanying figures given by way of non-limiting illustrations.

FIG. 7 shows a block diagram of control signalling bits on a control channel and a further block diagram of inband signalling bits according to an embodiment of the invention.

DESCRIPTION OF THE EMBODIMENTS

Figure 1:
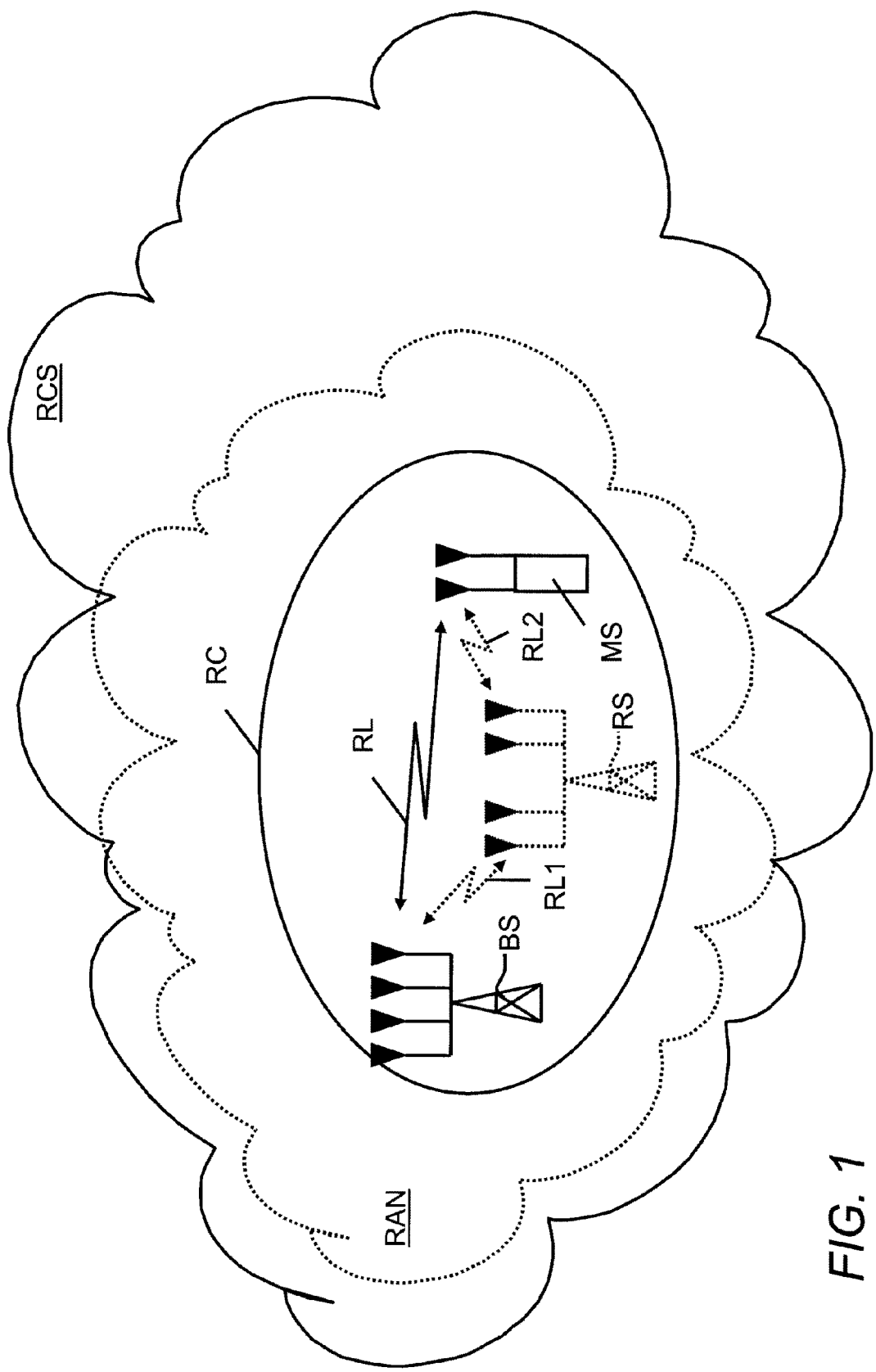
FIG. 1 shows a block diagram of a radio communication network.

FIG. 1 shows a radio communication system RCS comprising a radio access network RAN. The core network of the radio communication system RCS and connections of the radio communication system RCS to further radio communication systems, to the Internet or to fixed line communications systems are not shown for simplification.

The radio communication system RCS may be for example a 3GPP LTE radio communication network using OFDM (OFDM=Orthogonal Frequency Division Multiplexing). In further alternatives, the radio communication system RCS may for example a 3GPP UMTS/HSPA radio communication network (UMTS=Universal Mobile Telecommunication Systems, HSPA=High Speed Packet Access), a WiMAX radio communication network (WiMAX=Worldwide Interoperability for Microwave Access) based for example on the IEEE 802.16d standard (IEEE=Institute of Electrical and Electronics Engineers), or a WLAN (WLAN) based for example on the IEEE 802.11g standard.

The radio access network RAN comprises a base station BS. The term "base station" may be considered synonymous to and/or referred to as a base transceiver station, base station, Node B, enhanced Node B, access point etc. and may describe equipment that provides connectivity via a radio link between the radio communication system RCS and one or more mobile stations.

Further base stations, connections between the base stations, connections between the base stations and network nodes of the core network and further radio cells of the radio access network RAN are not shown for simplification.

The base station BS is responsible for a radio cell RC. The term "radio cell" considered synonymous to and/or referred to as radio cell, cell, radio sector, sector etc.

In an alternative, the radio access network RAN may comprise additionally one or several relay stations for relaying radio signals between one or several base stations and one or several mobile stations.

A mobile station MS is located within the wireless coverage area of the radio cell RC.

The term "mobile station" may be considered synonymous to, and may hereafter be occasionally referred to, as a mobile unit, mobile station, mobile user, access terminal, user equipment, subscriber, user, remote station etc. The mobile station MS may be for example a cellular telephone, a portable computer, a pocket computer, a hand-held computer, a personal digital assistant or a car-mounted mobile device.

The base station BS communicates with the mobile station MS via a radio link RL. Alternatively, the base station BS communicates with a relay station RS via a first radio link RL1 and the relay station RS communicates with the mobile station MS via a second radio link RL2. In a further alternative, the base station BS communicates with the relay station RS via the first radio link RL1 and the relay station RS communicates with the mobile station MS via the second radio link RL2 and additionally the base station BS communicates with the mobile station MS via the radio link RL. In an even further alternative, a communication between the base station BS and the mobile station MS is relayed by more than one relay station.

The base station BS and the mobile station MS may use on a downlink from the base station BS to the mobile station MS an ARQ scheme or a HARQ scheme and/or may use on an uplink from the mobile station MS to the base station BS a further ARQ scheme or a further HARQ scheme. The HARQ scheme and/or the further HARQ may be combined with soft combining. The HARQ scheme and/or the further HARQ may be synchronous or asynchronous. Likewise, the ARQ scheme and/or the further ARQ scheme may be synchronous or asynchronous.

The base station BS, when receiving on the uplink a negative acknowledgement from the mobile station MS or from the relay station for first downlink data, which have been transmitted from the base station BS to the mobile station MS or the relay station and which could not be recovered error free, may perform a single retransmission for the first downlink data or the base station BS may determine a downlink combination of the first downlink data and of one or several second downlink data by applying a superposition of the first downlink data and the one or several second downlink data and the base station BS may transmit via the radio link RL the downlink combination of the first downlink data and the one or several second downlink data to the mobile station MS or to the relay station.

The mobile station MS is a single data sink for the first downlink data and for the one or several second downlink data. The first downlink data may be user data or signaling data. Likewise, the one or several second downlink data may be user data or signaling data. This means, that the data of the combination are only user data, are only signaling data or are a mixture of user data and signaling data.

Alternatively, the relay station may be a single data sink for the first downlink data and the one or several second downlink data and the combination of the first downlink data and the one or several second downlink data may be used as a retransmission for the first downlink data and a retransmission for the one or several second downlink data or may be used as a retransmission for the first downlink data and an initial transmission for the one or several second downlink data for signaling information from the base station BS to the relay station.

Single data source with respect to a network node means, that the data are generated at this network node because the network node is an endpoint of a user service such as a voice over IP call or because the network node requires signaling control information such as status information to another network node. Single data sink with respect to a network node means, that the data are received at this network node because the network node is an endpoint of a user service such as a voice over IP call or because the network node requires receiving control information such as status information from another network node.

Table 1 shows which network nodes of the radio access network RAN can be for example a single data sink or a single data source for the first and second data according to the invention depending on a direction of the information flow, if the first and second data are user data.

TABLE 1

| Direction | First network node | Second network node | Third network node |
|---|---|---|---|
| Downlink | Base station | Mobile station as single data sink | |
| Downlink | Base station | Relay station | Mobile station as single data sink |
| Downlink | Relay station | Mobile station as single data sink | |
| Uplink | Mobile station as single data source | Base station | |
| Uplink | Mobile station as single data source | Relay station | |
| Uplink | Relay station | Base station | Mobile station as single data source |

Table 2 shows which network nodes of the radio access network RAN can be for example a single data sink or a single data source for the first and second data according to the invention depending on a direction of the information flow, if the first and second data are control data or signaling data.

TABLE 2

| Direction | First network node | Second network node | Third network node |
|---|---|---|---|
| Downlink | Base station | Mobile station as single data sink | |
| Downlink | Base station | Relay station as single data sink | |
| Downlink | Base station | Relay station | Mobile station as single data sink |
| Downlink | Relay station | Mobile station as single data sink | |
| Uplink | Mobile station as single data source | Base station | |
| Uplink | Mobile station as single data source | Relay station | |

TABLE 2-continued

| Direction | First network node | Second network node | Third network node |
|---|---|---|---|
| Uplink | Relay station as single data source | Base station | |
| Uplink | Relay station | Base station | Mobile station as single data source |

Control parameters for the downlink combination such as information about a downlink resource block assignment, downlink modulation schemes of the first downlink data and of the one or several second downlink data, downlink coding schemes of the first downlink data and of the one or several second downlink data or downlink redundancy versions of the first downlink data and of the one or several second downlink data may be fully signaled on a downlink control channel, may be partly signaled on a downlink control channel and partly multiplexed to the downlink combination or may be fully multiplexed to the downlink combination. In further alternatives, some of the control parameters for the downlink combination may be partly predefined or implicitly defined. Likewise, the mobile station MS, when receiving on the downlink a negative acknowledgement from the base station BS or from the relay station for first uplink data, which have been transmitted from the mobile station MS to the base station BS or the relay station and which cannot be recovered error free, may perform a single retransmission for the first uplink data or the mobile station MS may determine an uplink combination of the first uplink data and of one or several second uplink data by applying a superposition of the first uplink data and the one or several second uplink data and the mobile station MS may transmit via the radio link RL the uplink combination to the base station BS or the relay station.

The first uplink data and the one or several second uplink data may be user data or signaling data from the mobile station MS being a single data source for the first uplink data and for the one or several second uplink data.

Alternatively, the relay station may be a single data source of the first uplink data and the one or several second uplink data and the combination of the first uplink data and the one or several second uplink data may be used as a retransmission for the first uplink data and a retransmission for the one or several uplink data or may be used as a retransmission for the first uplink data and an initial transmission for the one or several uplink data for signaling information from the relay station to the base station BS.

The base station BS may transmit to the mobile station MS an indication, whether to perform an uplink retransmission with the uplink combination of the first uplink data and the one or several second uplink data.

Control parameters for the uplink combination such as information about an uplink resource block assignment, uplink modulation schemes of the first uplink data and of the one or several second uplink data, uplink coding schemes of the first uplink data and of the one or several second uplink data or uplink redundancy versions of the first uplink data and of the one or several second uplink data may be fully signaled on an uplink control channel, may be partly signaled on an uplink control channel and partly multiplexed to the uplink combination, or may be fully multiplexed to the uplink combination. This can be used for example in 3GPP UMTS communication systems, if the mobile station is allowed to decide about the uplink modulation schemes of the first uplink data and of the one or several second uplink data, the uplink coding schemes of the first uplink data and of the one or several second uplink data and/or the uplink redundancy versions of the first uplink data and of the one or several second uplink data.

In an alternative, one or several of the control parameters for the uplink combination may be fully signaled on a downlink control channel, may be partly signaled on a downlink control channel and partly multiplexed to the downlink combination or to downlink single data, or may be fully multiplexed to the downlink combination. In LTE for example an uplink scheduler in an enhanced Node B decides about the uplink modulation schemes of the first uplink data and of the one or several second uplink data, the uplink coding schemes of the first uplink data and of the one or several second uplink data and/or the uplink redundancy versions of the first uplink data and of the one or several second uplink data.

In further alternatives, some of the control parameters for the uplink combination may be partly predefined or implicitly defined.

Figure 2:
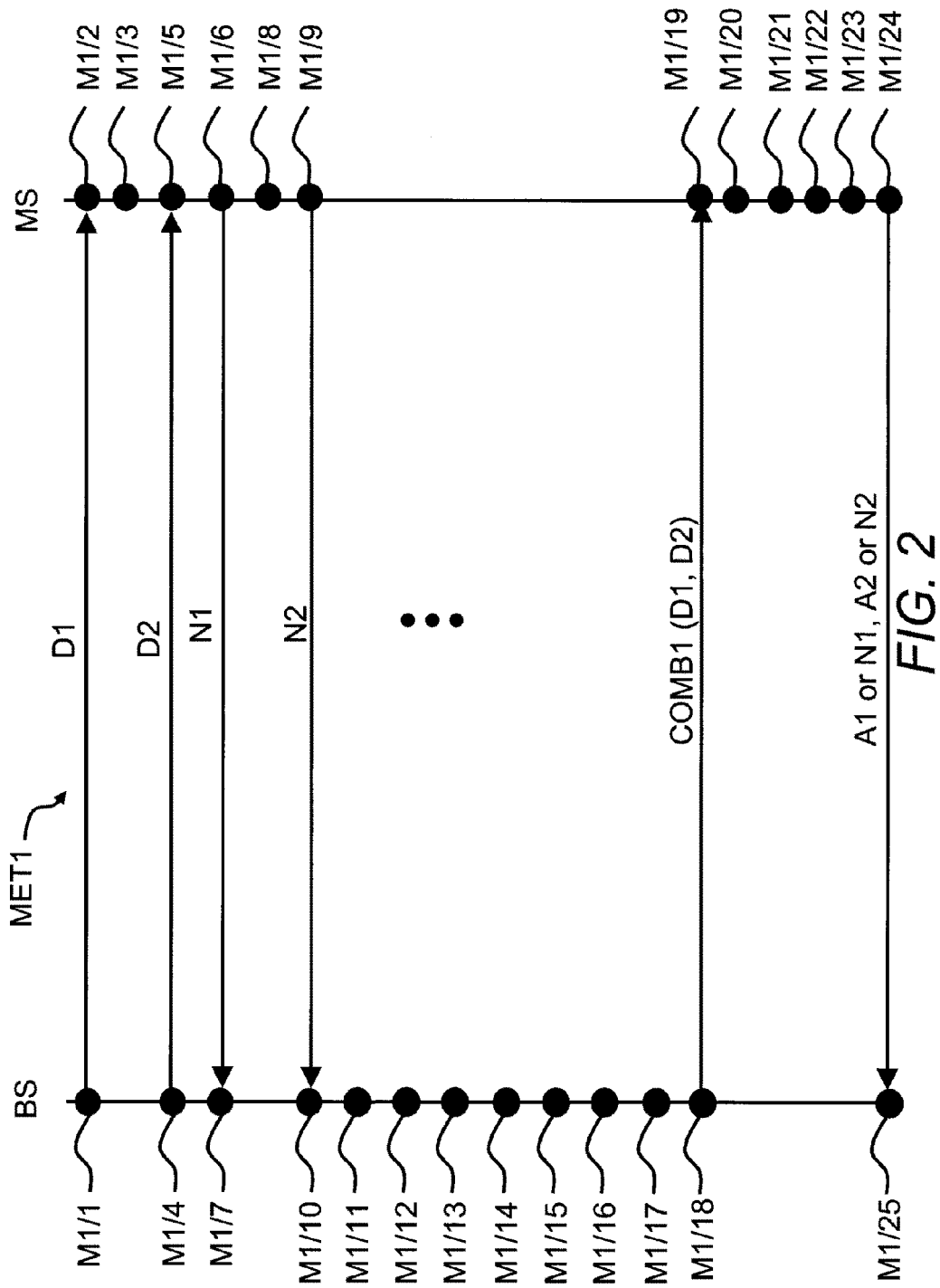
FIG. 2 shows a flow diagram of a method in accordance to an embodiment of the invention.

Referring to FIG. 2 a flow diagram of a method MET1 in accordance to a first embodiment of the invention is shown. The number of the steps for performing the method MET1 is not critical, and as can be understood by those skilled in the art, that the number of the steps and the order of the steps may vary without departing from the scope of the invention.

The method MET1 is shown with respect to a downlink transmission of downlink user data from the base station BS to the mobile station MS. If a relay station is used between the base station BS and the mobile station MS, a similar downlink method may be performed between the base station BS and the relay station and/or between the relay station and the mobile station MS.

As can be understood by those skilled in the art, a similar method may be performed for an uplink transmission of uplink user data from the mobile station MS to the base station BS. If a relay station is used between the mobile station MS and the base station BS, a similar uplink method may be performed between the mobile station BS and the relay station and/or between the relay station and the base station BS.

In a first step M1/1, the base station BS transmits modulated and coded first data D1 of the mobile station MS in a first HARQ process in an initial transmission for example via the PDSCH (PDSCH=physical downlink shared channel) used in LTE to the mobile station MS. The first data D1 preferably comprise first information bits for example for a mobile service running on the mobile station MS and first parity bits of first parity information deduced from the first information bits.

The first data D1 may be data of a data stream to the mobile station MS as a single data sink. In case of an uplink transmission, the first data D1 may be data of the data stream from the mobile station MS as a single data source.

The first data D1 are transmitted in one or several physical resource blocks such as used for example in LTE with a frequency range of 180 kHz with 12 consecutive OFDM subcarriers and a time duration of one subframe, which is 1 ms in the case of LTE.

In a next step M1/2, the mobile station MS receives the modulated and coded first data D1.

In a further step M1/3, the mobile station MS demodulates and decodes the first data D1 and may perform a first CRC using the first parity information for determining any first transmission errors of the first data D1 and preferably, the mobile station MS may store the modulated and coded first data D1 or alternatively may store the demodulated first data D1.

In a next step M1/4, the base station BS may transmit modulated and coded second data D2 of the mobile station MS in a second HARQ process in an initial transmission for example via the PDSCH to the mobile station MS. The second data D2 preferably comprise for example second information bits for the mobile service or a different mobile service running on the mobile station MS and second parity bits of second parity information deduced from the second information bits.

The second data D2 may be data of the data stream or of a further data stream to the mobile station MS as the single data sink. In case of an uplink transmission, the second data D2 may be data of the data stream or the further data stream from the mobile station MS as the single data source. The second data D2 are transmitted in one or several physical resource blocks.

In a further step M1/5, the mobile station MS receives the modulated and coded second data D2.

In a next step M1/6, the mobile station MS transmits a first negative acknowledgement N1 to the base station BS, if the mobile station MS cannot recover error free the first data D1.

In a further step M1/7, the base station BS receives the first negative acknowledgement N1.

In a next step M1/8, the mobile station MS demodulates and decodes the second data D2 and performs a second CRC using the second parity information for determining any transmission errors of the second data UD2 and preferably, the mobile station MS stores the modulated and coded second data D2 or the demodulated second data D2 in a similar way as in step M1/3 for the first data D1.

In a further step M1/9, the mobile station MS transmits a second negative acknowledgement N2 to the base station BS, if the mobile station MS cannot recover error free the second data D2.

In a next step M1/10, the base station BS receives the second negative acknowledgement N2.

The first and the second negative acknowledgement N1, N2 may comprise in addition an indicator of a quality of reception at the mobile station MS such as a signal to noise and interference ratio or soft reliability information of the decoder of the mobile station MS. The indicator of the quality of reception may indicate how much redundancy is still required at the mobile station MS for recovering the first data D1 and the second data D2 error free. The base station BS may use the indicator of the quality of reception to determine an amount of further first parity information and further second parity information required for the mobile station MS to recover the first user data UD1 and the second user data UD2 by soft combining. A result of the determined amount may be used by the base station BS to decide, if it would be better to perform single retransmissions for the first data D1 and the second data D2 with parity information adapted to the result, or if the base station BS may use a combined retransmission for the first data D1 and the second data D2.

Figure 4:
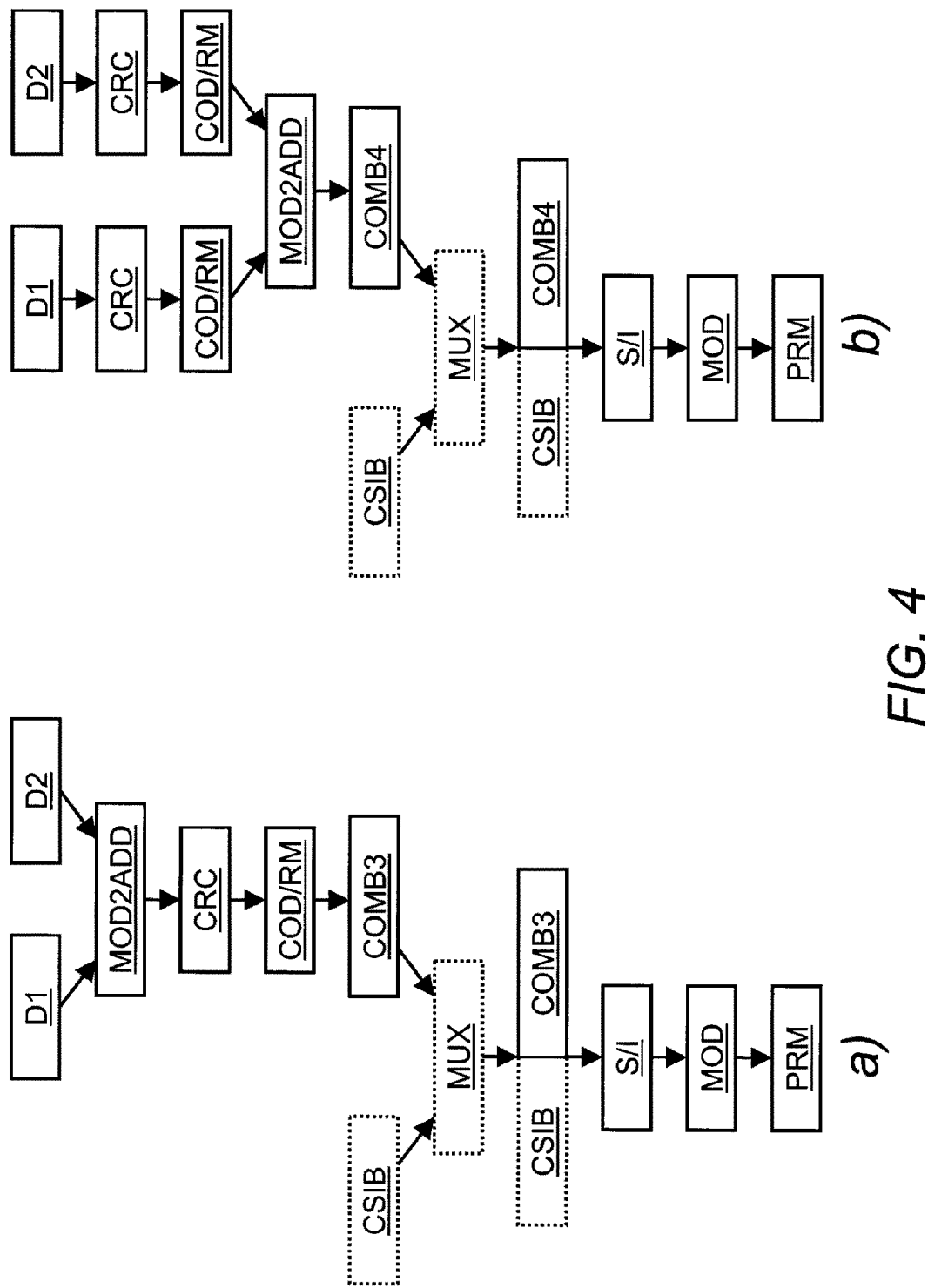
FIG. 4 shows two block diagrams for determining combinations of data by applying a superposition of the data according to two embodiments of the invention.

Next steps M1/11 to M1/17 are performed according to a flow diagram of FIG. 4 a). Alternatively, next steps executed by the base station BS may be performed according to flow diagrams of FIG. 4 b) or FIG. 5 a).

In a further step M1/11, the base station BS determines the combination of the first data D1 and the second data D2 by applying a superposition of the first data D1 and the second data D2. The superposition according to FIG. 4 a) is a bitwise modulo 2 addition of the first data D1 and the second data D2. If for example the first data D1 comprises fewer bits than the second data D2, the base station BS may add bits to the first data D1 by a repetition of bits of the first data D1. Thereby, a number of bits of the first data D1 and the second data D2 are equalized.

The base station BS may apply the determination of the combination for example only, if the first data D1 and the second data D2 do not belong to a delay sensitive quality of service class. The combination may be for example preferably determined if both the first data D1 and the second data D2 belong to a single background service or to different background services.

In a next step M1/12, the base station BS may optionally add CRC bits to the combination and codes the combination with an error correction encoding scheme.

The error correction encoding scheme may be adapted to radio conditions and/or to a quality of service class of the first data D1 and the second data D2 such as a background service class or an interactive service class. The background and interactive service classes may comprise services such as web browsing, file transfer, video download and real-time or other delay sensitive service classes may comprise services such as gaming, video conference or voice over IP.

In a further step M1/13, the base station BS selects RV parameters (RV=redundancy version) and performs a rate matching with the selected RV parameters.

Control information of the first data D1 and the second data D2 is required at the mobile station MS for being able to identify, to decode, to demodulate, to descramble and/or to deinterleave the first data D1 and the second data D2. An indication of the first data D1 and an indication of the second data D2 may be explicitly signalled to the mobile station MS or may be implicitly provided to the mobile station MS, if the method MET1 may be based for example on a synchronous HARQ process. Further control information of the first data D1 and the second data D2 of one or several physical layer processing parameters, which may be changed between successive HARQ processes or which may be changed between successive transmissions of a same HARQ process, such as a modulation scheme to be applied at the base station BS and/or a coding scheme to be applied at the base station BS may be signalled by indications on a control channel such as an LTE downlink control channel.

In an alternative, the control information of the first data D1 and the second data D2 may be partly signalled on the control channel (e.g. only control information of the first data D1) and partly multiplexed to the combination of the first data D1 and the second data D2 (e.g. only control information of the second data D2 is multiplexed) or the control information of the first data D1 and the second data D2 may be fully multiplexed to the combination of the first data D1 and the second data D2.

Preferably, control information of the first data D1 and the second data D2 of specific physical layer processing parameters, which may be not often changed between successive HARQ processes or which may be not often changed between successive transmissions of the same HARQ process, such as an indication of a scrambling scheme to be applied at the base station BS for the first data D1 and/or an indication of an interleaving scheme to be applied at the base station BS for the first data D1 may be predefined at the base station BS and at the mobile station MS or may be implicitly defined for example by applying for the second data D2 a same scrambling scheme and/or a same interleaving scheme as being applied for the first data D1. In an alternative, indications of the scrambling and/or interleaving scheme may be signalled on the control channel.

In a next step M1/14, the base station optionally multiplexes control information of the first data D1 and/or the second data D2 to the rate matched combination. The control information of the first data D1 and/or the second data D2 may be separately encoded before the multiplexing step M1/14 is applied.

In a further step M1/15, the base station BS scrambles the multiplexed combination of the first data D1 and the second data D2 with a scrambling scheme and interleaves the scrambled combination with an interleaving scheme.

In a next step M1/16, the base station BS modulates the interleaved combination with a modulation scheme.

The modulation scheme may be adapted to the radio conditions and/or to the quality of service class of the first data D1 and the second data D2.

In a further step M1/17, the base station BS performs a physical resource mapping of the modulated combination to one or several physical resource blocks of the downlink of the radio link RL.

In parallel with the steps M1/11 to M1/17, the base station BS may perform further initial transmissions for further data by using further HARQ processes.

In a next step M1/18, the base station BS transmits the modulated, scrambled and interleaved combination COMB1 of the first data D1 and the second data D2 preferably as a unicast via one or several physical resource blocks of the radio link RL for example via the PDSCH to the mobile station MS.

In a further step M1/19, the mobile station MS receives the modulated, scrambled and interleaved combination COMB1.

In a next step M1/20, the mobile station MS determines a location of the combination COMB1 within a full set of available physical resource blocks. The base station BS may transmit information of the location of the combination COMB1 within the full set of available physical resource blocks to the mobile station MS by including the information of the location in a dedicated information field of a control signalling message such as a downlink scheduling grant used in 3GPP LTE/HSDPA, which may be a small packet on a downlink control channel (see FIG. 7 a): resource block assignment RBA).

In a further step M1/21, the mobile station MS demodulates the combination COMB1.

In a next step M1/22, the mobile station MS determines the location of the multiplexed combination COMB1 and the multiplexed control information by descrambling and de-interleaving.

The base station BS may transmit information of the location of the multiplexed combination and the multiplexed control information within the full set of available physical resource blocks to the mobile station MS by including the information of the location in the dedicated information field of the control signalling message such as the downlink scheduling grant used in 3GPP LTE/HSDPA.

In a further alternative, a multiplexing scheme how to multiplex the control information and the combination COMB1 may be predefined at the base station BS and at the mobile station MS. In such a case, no information of the location of the multiplexed control information and the multiplexed combination must be transmitted to the mobile station MS.

In further steps M1/23, the mobile station MS performs a decoding, a CRC check and a soft combining by using the combination COMB1 of the first data D1 and the second data D2 as a kind of additional parity information of the first data D1 and the second data D2.

Therefore, the mobile station MS recovers the second data D2 by subtracting a stored estimate of the first data D1 of the previous transmission (steps M1/1, M1/2) from an estimate of the combination COMB1:

$$D2=(D1+D2)-D1$$

For recovering the second data D2, the mobile station MS may also perform a soft-combining of the stored estimate of the second data D2 with the estimate obtained from the subtraction D2=(D1+D2)−D1 prior to the decoding.

The mobile station MS further recovers the first data D1 by subtracting a stored estimate of the second data D2 of the previous transmission (steps M1/4, M1/5) from the estimate of the combination COMB1:

$$D1=(D1+D2)-D2$$

Alternatively, the mobile station MS may recover the first data D1 by subtracting the recovered second data D2 from the estimate of the combination COMB1.

For recovering the first data D1, the mobile station MS may also perform a soft-combining of the stored estimate of the first data D1 with the estimate obtained from the subtraction D1=(D1+D2)−D2 prior to the decoding. Preferably, the transmission errors inherent in the estimates of the first data D1, the second data D2 and the combination COMB1 shall be uncorrelated to obtain a performance benefit from the above mentioned soft combining steps. This property can be improved by introducing for example following additional processing steps:

performing a different physical resource assignment for the first data D1, the second data D2 and the combination COMB1, e.g. the base station BS may allocate different physical resource blocks to the initial transmissions of the first data D1 and the second data D2 and to the transmission of combination COMB1, performing a time-variant scrambling and interleaving S/I, e.g. applying different interleaving patterns in each sub-frame by using for example a cyclic shift or a pseudo-random permutation.

If the combination for example comprises a modulo 2 addition of the first data D1, the second data D2 and third data D3 and the third data D3 have been transmitted from the base station BS to the mobile station MS beforehand in an initial single transmission, the first data D1, the second data D2 and the third data D3 could be recovered by following calculations:

$$D1=(D1+D2+D3)-D2-D3$$

$$D2=(D1+D2+D3)-D1-D3$$

$$D3=(D1+D2+D3)-D1-D2$$

If the first data UD1 and/or the second data UD2 cannot be recovered error free by using the received combination COMB1, corresponding negative acknowledgements are transmitted from the mobile station MS to the base station BS and a further retransmission of the first data D1 and/or the second user D2 may be performed by using a further combination of data or by using single retransmissions.

In next steps M1/24, the mobile station MS transmit for the received combination COMB1 of the first data D1 positive or negative acknowledgements A1 or N1 and for the second data D2 positive or negative acknowledgements A2 or N2 separately (e.g. using two bits), if only one of the first and the second data D1, D2 could be recovered error free (possible combinations of transmitted positive and/or negative acknowledgements: A1 and A2, N1 and N2, A1 and N2, N1 and A2), or the mobile station MS may transmit for the received combination COMB1 one single positive or negative acknowledgement (e.g. using one bit), if both the first and the second data D1, D2 could or could not be recovered error free.

The negative acknowledgement for a reception of the combination COMB1 may also comprise an indicator indicating a quality of reception at the mobile station MS such as a signal to noise and interference ratio or soft reliability information of the decoder of the mobile station MS. The indicator may be used at the base station BS for adapting algorithms at the base station BS optimizing physical layer parameters for further initial transmissions and for further single retransmissions or combined retransmissions.

In case of LTE, radio resources for a single positive or negative acknowledgement or for multiple positive or negative acknowledgements may preferably be implicitly allocated by tagging the multiple positive or negative acknowledgements to a control channel element used for a downlink scheduling grant such as proposed in 3GPP LTE (see for example 3GPP TS36.213 Chapter 10.1).

In further steps M1/25, the base station BS receives the separate positive or negative acknowledgements A1, A2, N1, N2 or the combined positive or negative acknowledgement.

In an alternative embodiment, a relay station may be used between the base station BS and the mobile station MS. The relay station may be for example a type 2 relay such as proposed for 3GPP LTE.

The relay station also receives the modulated and coded first and second data D1, D2, demodulates and decodes the first and second data D1, D2, performs a first CRC using the first and the second parity information for determining any first transmission errors of the first and second data D1, D2 and stores the error free demodulated and decoded first and second data D1, D2. There is a much higher possibility, that the relay station can error free demodulate and decode the first and second data D1, D2, because the relay station may be located closer to the base station BS than the mobile station MS or the base station BS may use an exclusive radio link to the relay station using directive antennas.

The relay station also receives the first negative acknowledgement N1 and the second negative acknowledgement N2 for example by overhearing. Alternatively, the base station BS receives the first and second negative acknowledgement N1, N2 and forwards the first and second negative acknowledgement N1, N2 to the relay station.

The relay station RS may determine that the relay station RS has received within the time interval TI a further successive negative acknowledgement N2 for the second data D2 (see FIG. 3 a)). Then, the relay station RS may determine similar to the step M1/11 the combination COMB1 and performs instead of the base station BS similar steps M1/12 to M1/17.

In an alternative, the base station BS may signal to the relay station RS, how to determine the combination COMB1 by transmitting for example indications for a coding scheme or the coding schemes to be applied for determining the combination COMB1.

The base station BS may transmit an indication for the transmission of the combination COMB1 to the mobile station MS1 indicating that the combined transmission COMB1 can be expected and preferably a point in time, when the combined transmission COMB1 will be transmitted. The relay station RS may overhear the indication for the transmission of the combination COMB1 to know the time, when to transmit the combination COMB1.

In an alternative, the base station BS may transmit a specific indication to the relay station RS, when to transmit the combination COMB1. In a further alternative, no indication IND to the mobile station MS and no specific indication to the relay station RS may be required and there may be an implicit timing, if for example a synchronous HARQ process is being applied.

In case of the alternative embodiment, the relay station RS instead of the base station BS transmits the combination COMB1 to the mobile station MS1.

In case of an even further alternative embodiment, multiple protocol data units may be transmitted over different spatial layers simultaneously, possibly using same physical resource blocks, if the base station BS, the relay station RS and/or the mobile station MS comprise multiple antennas (see FIG. 1), which introducing multiple radio propagation paths corresponding to multiple spatial layers.

In such a case, the HARQ process may be identified by a HARQ process number and a spatial layer identifier.

The combination COMB1 may be determined by applying a superposition of the first data D1 of a first spatial layer and the at least second data D2 of a second spatial layer. The first data D1 may belong for example to a first HARQ process on the first spatial layer and the second data D2 may belong to a third HARQ process of the second spatial layer.

Figure 3:
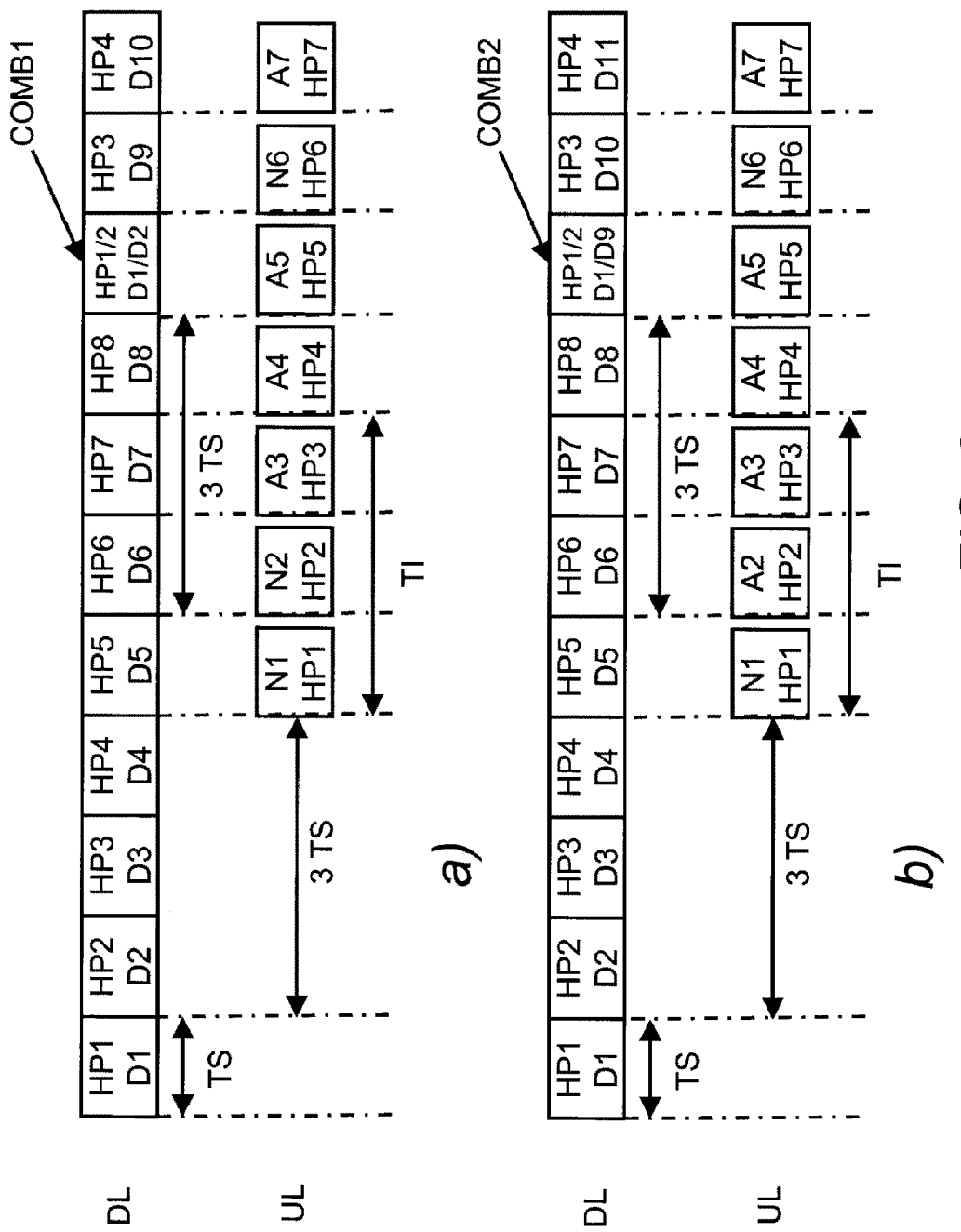
FIG. 3 shows a block diagram of successive process transport blocks comprising data on a downlink channel and positive or negative acknowledgements on an uplink channel.

FIG. 3 a) shows schematically a transmission of data D1 to D10 within successive process transport blocks (indicated by rectangles) using 8 HARQ processes HP1-HP8 such as used in 3GPP LTE or 3GPP HSDPA on the downlink DL and a transmission of positive and negative acknowledgements N1, N2, A3, A4, A5, N6, A7 on the uplink UL for the 8 HARQ processes HP1-HP8 according to the method MET1 of FIG. 2. The process transport blocks each having a length of one time slot TS (length of one subframe in 3GPP LTE) comprise data D1 to D10, which are transmitted for example from the base station BS to the mobile station MS such as shown in FIG. 2.

The mobile station MS receiving the process transport blocks, checks for transmission errors and transmits the positive or negative acknowledgements N1, N2, A3, A4, A5, N6, A7 for example 3 time slots TS after receiving the process transport blocks. In a same way, the base station BS may perform a retransmission for the negative acknowledgements N1, N2, N6 for example in a range of three to five time slots TS after receiving the negative acknowledgements N1, N2, N6 (in 3GPP LTE a retransmission is performed at least 4 subframes after receiving a negative acknowledgement, if an asynchronous HARQ process is used). If the base station BS receives the first negative acknowledge N1 for the first user D1, a predefined time interval TI of a length of for example three time slots TS may start. The time interval TI may be configured at the base station BS for example by an O&M network node (O&M=Operation and Maintenance) and may depend on a quality of service class of the data UD1 to D10.

If within the time interval TI the base station BS may receive a second successive negative acknowledgement N2 for the second data D2, the base station BS may be configured to switch from a single retransmission of parity information for one of the first and second data D1, D2 to a retransmission of the combination COMB1 of the first and second data D1, D2. If no second negative acknowledgement will be received within the time interval TI, the base station BS may perform the single retransmission for the first data D1 in order to fulfil constraints to overall transmission time delays for example.

Similarly, if the first negative acknowledgement N1 and the second negative acknowledgement N2 are transmitted from the mobile station MS within the time interval TI and the indication for the combined transmission using the combination COMB1 is implicitly provided to the mobile station MS by transmitting the first negative acknowledgement N1 and the second negative acknowledgement N2 within the time interval TI.

Alternatively, the mobile station MS also knowing the time interval TI can itself determine based on a time scale of the transmitted positive or negative acknowledgements, when it can expect a new initial transmission of data, a retransmission of data as a single retransmission or a retransmission of data as a combined retransmission due to the time constraints of the synchronous HARQ process.

In such cases, no explicit indication indicating an initial transmission of a new set of user data, indicating a single retransmission of user data for one specific previously transmitted set of user data or indicating a combined retransmission of user data for two specific previously transmitted sets of user data may be required and signalled from the base station BS to the mobile station MS.

The combination COMB1 of the first data D1 for the first HARQ process HP1 and the second data D2 for the second HARQ process HP2 by using the superposition of the first data D1 and the second data D2, is included in one process transport block with the time length of one time slot TS (e.g. one subframe such as used in 3GPP LTE). This can be done, because the combination of the first and second data D1, D2 may not comprise more bits than a larger one of the single data D1, D2.

It is also possible, that a radio communication standard will allow expanding a process transport block across two or more time slots TS. If the initial transmissions of the first and second data D1, D2 may be performed for example with a half bandwidth of a system bandwidth (e.g. half bandwidth of 10 MHz system full bandwidth or of 20 MHz system full bandwidth in case of 3GPP LTE; the system bandwidth is the bandwidth specifically dedicated for example by a regulation authority to a mobile operator), the transmission of combination COMB1 may be performed with the full bandwidth of the system bandwidth.

FIG. 3 b) shows schematically a transmission of data D1 to D11 within successive process transport blocks (indicated by rectangles) using 8 HARQ processes HP1-HP8 such as used in 3GPP LTE or 3GPP HSDPA on the downlink DL and a transmission of positive and negative acknowledgements N1, A2, A3, A4, A5, N6, A7 on the uplink UL for the 8 HARQ processes HP1-HP8 according to a further embodiment of the invention.

The difference between the FIG. 3 b) and the FIG. 3 a) is that the mobile station MS recovers error free the second data D2 in FIG. 3 b) and therefore transmits a positive acknowledgement A2 to the base station BS.

The base station BS may determine that the base station BS has not received within the time interval TI a further successive negative acknowledgement N1 for the first data D1. Therefore, the base station BS determines a combination COMB2 of the first data D1 and ninth data D9, which have been not transmitted before by applying a superposition of the first data D1 and the ninth data D9 for example by using a modulo 2 addition.

Further processing of the combination COMB2 at the base station BS may be similarly performed as described for the method MET1 according to FIG. 2.

The base station BS transmits the modulated, scrambled and interleaved data of the combination COMB2 via one or several physical resource blocks of the radio link RL to the mobile station MS.

Further processing of the received combination COMB2 at the mobile station MS may be similarly performed as described for the method MET1 according to FIG. 2.

The mobile station MS recovers the ninth data D9 by subtracting a stored estimate of the first data D1 of a previous transmission from an estimate of the combination COMB2:

$$D9=(D1+D9)-D1$$

The mobile station MS is able to recover the first data D1 by subtracting the recovered ninth data D9 from the estimate of the combination COMB2 and not by using a stored estimate of the ninth data D9, which cannot exist due to the initial transmission of the ninth data D9 within the combination COMB2:

$$D1=(D1+D9)-D9$$

Referring to FIG. 4 a) a block diagram for determining a combination of the first data D1 and the second data D2 and for performing physical layer processing according to an embodiment of the invention is shown.

The superposition of the first data D1 and the second data D2 is done by performing modulo 2 addition MOD2ADD of the first data D1 and the second data D2 by adding the bits of the first data D1 and the second data D2 bitwise. If for example the first data have a bit sequence of 10010111 and the second data have a bit sequence of 01100110, a result of the modulo 2 addition is:

```
D1:   10010111
D2: + 01100110
      ────────
      11110001
```

A bit length of the first data D1 and the second data D2 may be equalized prior to the modulo 2 addition for example by a repetition of bits of the data with the shorter bit length.

In next steps a CRC attachment CRC and an encoding and rate matching COD/RM may be applied for getting an encoded and rate matched combination COMB3.

Optionally, control information CSIB with one or several physical layer processing parameters of the first data D1 and/or the second data D2 may be multiplexed with a multiplexing step MUX to the combination COMB3 for example using a memory area or a data queue by putting the control information CSIB at first place of the memory area or at a beginning section of a data queue and by putting the combination COMB3 at second place of the memory area or at an end section of the data queue.

In an alternative, the control information CSIB is put at the second place of the memory area or at the end section of the data queue and the combination COMB3 is at the first place of the memory area or at the beginning section of the data queue.

In a further alternative, the control information CSIB may be split into several parts and the combination COMB3 may be split into several further parts and the several parts and the several further parts may be multiplexed like in a zip merge.

In following steps, scrambling and interleaving S/I, modulation MOD and physical resource mapping PRM are performed for preparing the combination COMB3 for transmission over the radio link RL.

Referring to FIG. 4 b) a block diagram for determining a combination of the first data D1 and the second data D2 and for performing physical layer processing according to a further embodiment of the invention is shown.

In first steps a CRC attachment CRC and an encoding and rate matching COD/RM may be applied separately for the first data D1 and the second data D2 for getting an encoded and rate matched first data and second data.

Then, the superposition of the encoded and rate matched first data and second data for getting a combination COMB4 is done by performing modulo 2 addition MOD2ADD of the encoded and rate matched first data and second data by adding the bits of the encoded and rate matched first data and second data bitwise.

A bit length of the encoded and rate matched first data and second data may be equalized prior to the modulo 2 addition for example by a repetition of bits of the encoded and rate matched data with the shorter bit length. Preferably, the bit length of the encoded and rate matched first data and second data may be equalized by applying suitable rate matching functions for the first and the second data D1, D2. In that case, an additional equalization step is not required.

Optionally, a further CRC attachment may be applied after the modulo 2 addition.

Optionally, control information CSIB with one or several physical layer processing parameters of the first data D1 and/or the second data D2 may be multiplexed with a multiplexing step MUX to the combination COMB4 for example using a memory area or a data queue by putting the control information CSIB at first place of the memory area or at a beginning section of a data queue and by putting the combination COMB4 at second place of the memory area or at an end section of the data queue.

In an alternative, the control information CSIB is put at the second place of the memory area or at the end section of the data queue and the combination COMB4 is at the first place of the memory area or at the beginning section of the data queue.

In a further alternative, the control information CSIB may be split into several parts and the combination COMB4 may be split into several further parts and the several parts and the several further parts may be multiplexed like in a zip merge.

In following steps, the scrambling and interleaving S/I, the modulation MOD and the physical resource mapping PRM are performed for preparing the combination COMB4 for transmission over the radio link RL.

Figure 5:
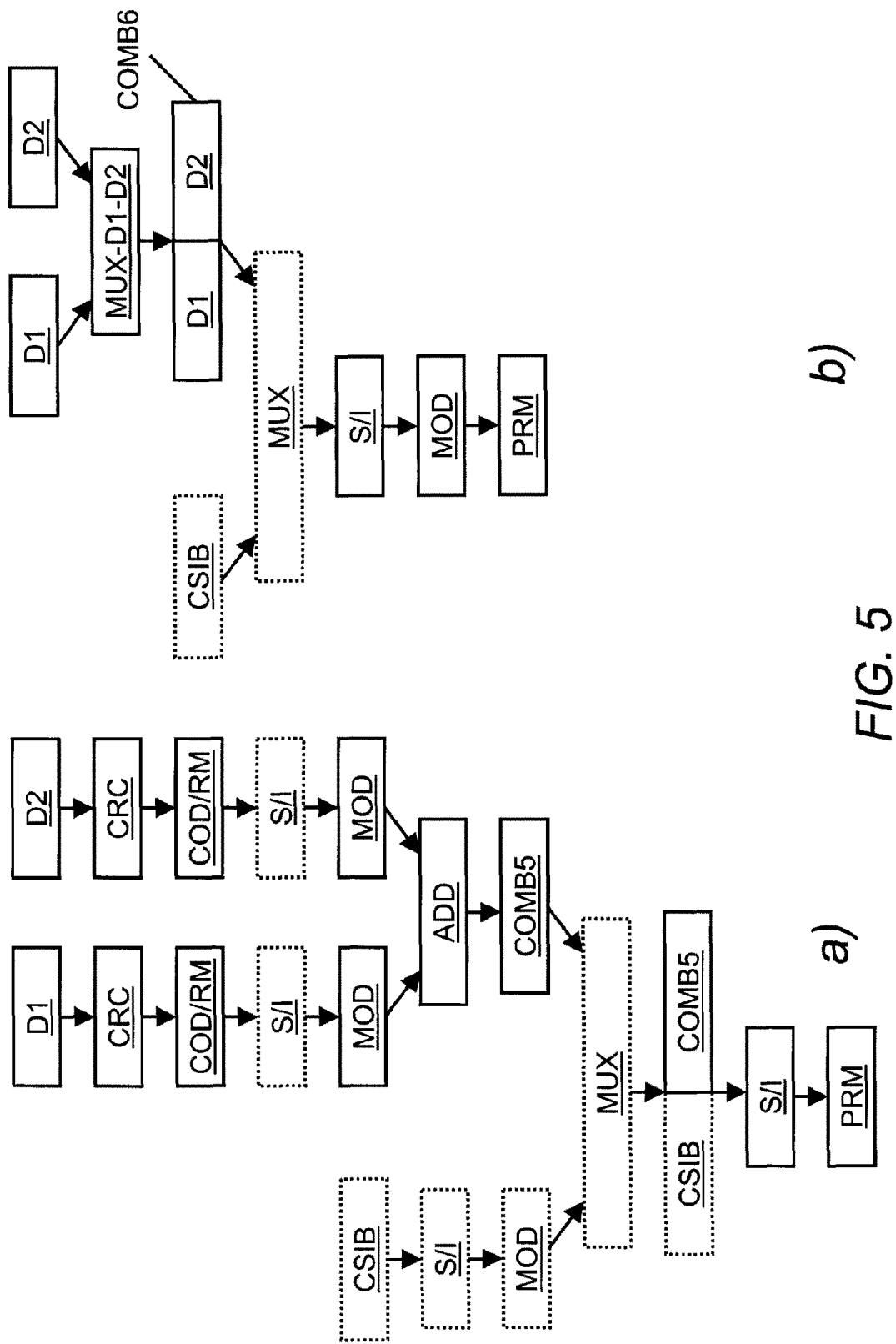
FIG. 5 shows a block diagram for determining a combination of data by applying a superposition of the data and a block diagram for determining a combination of data by multiplexing the data according to two further embodiments of the invention.

Referring to FIG. 5 $a$) a block diagram for determining a combination of the first data D1 and the second data D2 and for performing physical layer processing according to an even further embodiment of the invention is shown.

In first steps a CRC attachment CRC, an encoding and rate matching COD/RM, an optional scrambling and interleaving S/I and a modulation may be applied separately for the first data D1 and the second data D2 for getting modulated, scrambled, encoded and rate matched first data and second data.

Preferably, the bit length of the encoded and rate matched first data and second data may be equalized by applying suitable rate matching functions for the first and the second data D1, D2.

The first data D1 and the second data D2 may be modulated with a same modulation scheme such as QPSK, 16QAM or 64QAM or with different modulation schemes.

Then, the superposition of the modulated, scrambled, encoded and rate matched first data and second data for getting a combination COMB5 is determined by performing an addition ADD of real amplitudes of the modulated, scrambled, encoded and rate matched first data and second data and the addition ADD of imaginary amplitude values of the modulated, scrambled, encoded and rate matched first data and second data:

$D1: a1+i \cdot b1$ $D2: a2+i \cdot b2$ $COMB5: (a1+a2)+i \cdot (b1+b2)$

The addition ADD may be an unweighted or a weighted addition such as:

$COMB5: (k \cdot a1+(1-k) \cdot a2)+i \cdot (k \cdot b1+(1-k) \cdot b2)$ with a real-valued weighting factor $k \neq 1$.

The weighting factor k may also be complex-valued, e.g. a pseudo-random number of the form exp (i·2·pi·n/N), with integer values n, N wherein n<=N. The complex-valued weighting factor may be used to avoid destructive superposition of the first data D1 and the second data D2. A weighted addition may be applied for example, if the indicator indicating the soft reliability information of the decoder of the mobile station MS has been received at the base station BS. The indicator may indicate for example that 10% of decoded soft bits of the first data D1 are unreliable and 50% of decoded soft bits of the second data D2 are unreliable. Therefore, the combination COMB5 should comprise more information about the second data D2 than about the first data D1 and the weighting factor k may be set for example to following value: k=0.1.

Optionally, control information CSIB with one or several physical layer processing parameters of the first data D1 and/or the second data D2 may be scrambled and interleaved S/I, modulated MOD and multiplexed with a multiplexing step MUX to the combination COMB5 for example using a memory area or a data queue by putting the control information CSIB at first place of the memory area or at a beginning section of a data queue and by putting the combination COMB5 at second place of the memory area or at an end section of the data queue.

In an alternative, the control information CSIB is put at the second place of the memory area or at the end section of the data queue and the combination COMB5 is at the first place of the memory area or at the beginning section of the data queue.

In a further alternative, the control information CSIB may be split into several parts and the combination COMB5 may be split into several further parts and the several parts and the several further parts may be multiplexed like in a zip merge.

A separate scrambling/interleaving scheme and a separate modulation scheme for the control information CSIB are preferably predefined at the base station BS and the mobile station MS. Alternatively, indications for the separate scrambling/interleaving scheme and the separate modulation scheme of the control information CSIB are transmitted on the downlink control channel.

In following steps, the scrambling and interleaving S/I and the physical resource mapping PRM are performed for preparing the combination COMB5 for transmission over the radio link RL.

Figure 6:
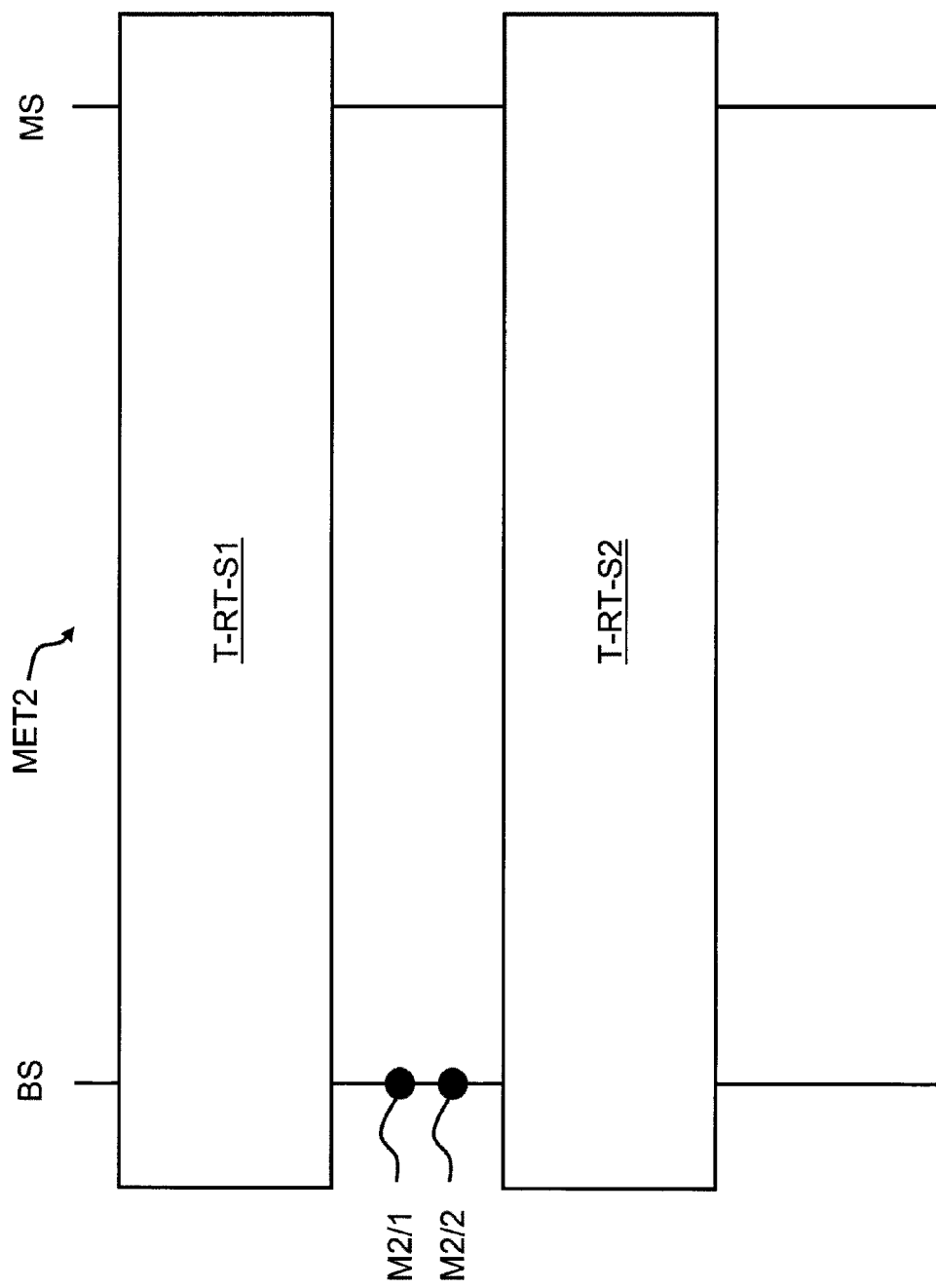
FIG. 6 shows a flow diagram of a further method in accordance to a further embodiment of the invention.

Referring to FIG. 6 a flow diagram of a method MET2 in accordance to a further embodiment of the invention is shown. The method MET2 is shown with respect to a downlink transmission of downlink user data from the base station BS to the mobile station MS. If a relay station is used between the base station BS and the mobile station MS, a similar downlink method may be performed between the base station BS and the relay station and/or between the relay station and the mobile station MS.

As can be understood by those skilled in the art, a similar method may be performed for an uplink transmission of uplink user data from the mobile station MS to the base station BS. If a relay station is used between the mobile station MS and the base station BS, a similar uplink method may be performed between the mobile station MS and the relay station and/or between the relay station and the base station BS.

At the beginning of the method MET2, the base station BS may transmit and retransmit data to the mobile station MS based on a first transmission and retransmission scheme T-RT-S1. The first transmission and retransmission scheme T-RT-S1 are for example several HARQ processes with single separate retransmissions of data for data not already acknowledged by the mobile station MS. The number of the steps for performing the method MET2 is not critical, and as can be understood by those skilled in the art, that the number of the steps and the order of the steps may vary without departing from the scope of the invention.

At step M2/1, the base station BS may receive a trigger for adapting the transmission and retransmission from the base station BS to the mobile station MS. The trigger may be for example an indication for a reception of two or more negative acknowledgements within the time interval TI (see FIG. 3a). Alternatively, the trigger may be a change of services running at the mobile station MS requiring a different QoS than a QoS of a current running service. The user of the mobile station MS first performing web browsing belonging to a QoS class of non-real time background services now wants to setup a mobile originated call belonging to a QoS of real-time services. In a further alternative, the trigger may indicate that radio resources for signalling may be overloaded.

In next step M2/2, the base station BS switches from the first transmission and retransmission scheme T-RT-S1 with the single separate retransmissions of data to a second transmission and retransmission scheme T-RT-S2 with combined retransmission of data using one of the combinations COMB1, COMB2, COMB3, COMB4, COMB5.

Similarly, the base station BS may switch back from the second transmission and retransmission scheme T-RT-S2 to the first transmission and retransmission scheme T-RT-S1 with the single separate retransmissions of data, if a further trigger is received.

In a further alternative, the first transmission and retransmission scheme T-RT-S1 may be based on applying the combination COMB1 with combined retransmissions for the first and the second data D1, D2 and the second transmission and retransmission scheme T-RT-S2 may be based on applying the combination COMB2 with the retransmission for the first data D1 and the first transmission for the second data D2. The base station BS2 may switch from the combination COMB1 to the combination COMB2, if for example only one negative acknowledgement has been received within the time interval TI (see FIG. 3) or if the second data D2 not yet transmitted require an immediate transmission due to delay requirements. In an even further alternative, the first transmission and retransmission scheme T-RT-S1 may be based on applying the combination COMB1 with combined retransmissions for the first and the second data D1, D2 and the second transmission and retransmission scheme T-RT-S2 may be based on applying a combination COMB6 with the retransmission for the first data D1 and the first transmission for the second data D2. FIG. 5 b) shows a block diagram for determining the combination COMB6 of the first data D1 and the second data D2 and for performing physical layer processing according to the even further alternative. The combination COMB6 is determined by multiplexing MUX-D1-D2 the first data D1 with the second data D2 for example using a memory area or a data queue by putting the first data D1 at first place of the memory area or at a beginning section of a data queue and by putting the second data D2 at second place of the memory area or at an end section of the data queue.

In an alternative, the first data D1 are put at the second place of the memory area or at the end section of the data queue and the second data D2 are put at the first place of the memory area or at the beginning section of the data queue.

In a further alternative, the first data D1 may be split into several parts and the second data D2 may be split into several further parts and the several parts and the several further parts may be multiplexed like in a zip merge. Optionally, control information CSIB with one or several physical layer processing parameters of the first data D1 and/or the second data D2 may be multiplexed with a further multiplexing step MUX to the combination COMB6 for example using a memory area or a data queue by putting the control information CSIB at first place of the memory area or at a beginning section of a data queue and by putting the combination COMB6 at second place of the memory area or at an end section of the data queue.

In an alternative, the control information CSIB is put at the second place of the memory area or at the end section of the data queue and the combination COMB6 is at the first place of the memory area or at the beginning section of the data queue.

In a further alternative, the control information CSIB may be split into several parts and the combination COMB6 may be split into several further parts and the several parts and the several further parts may be multiplexed like in a zip merge.

In following steps, the scrambling and interleaving S/I, the modulation MOD and the physical resource mapping PRM are performed for preparing the combination COMB6 for transmission over the radio link RL.

The base station BS2 may switch from the combination COMB1 to the combination COMB6, if for example the combined retransmission needs to be adapted due to a change of the QoS class of the services running at the mobile station MS (e.g. new service requires lower maximum transmission delay) and if the combination COMB6 has been evaluated for example as more robust to transmission errors than the combination COMB1.

Referring to FIG. 7 a) a block diagram of several fields of control signalling bits transmitted on a control channel according to an alternative embodiment of the invention is shown. The control signalling bits may be transmitted for each transmission and retransmission of data from the base station BS to the mobile station MS.

The control channel may be for example a shared control channel in HSPA such as High Speed Shared Control Channel (HS-SCCH) or a shared control channel in LTE such as Physical Downlink Control Channel (PDCCH). A sequence of the control signalling bits on the control channel may be provided for example within a downlink scheduling grant based on the DCI format 1 for LTE Release 8 as shown in FIG. 7 a).

The control signalling information on a control channel may comprise a resource allocation header RAH with 1 bit for example and a resource block assignment RBA for the combination COMB1, COMB2, COMB3, COMB4, COMB5, COMB6 with several bits or bytes.

The resource block assignment RBA may provide beside the information of the used frequency carriers also information, which parts of the assigned resources comprise the combination COMB1, COMB2, COMB3, COMB4, COMB5, COMB6 and which further parts comprise the control information CSIB.

The control signalling information on a control channel may further comprise a first modulation and/or coding scheme MCS1 using for example 5 bits for the first data D1 of the combination COMB1, COMB2, COMB3, COMB4, COMB5, COMB6 (a first transport block size TBS1 may be implicitly given, if modulation and coding scheme MCS1 is given such as proposed in 3GPP LTE, cf. 3GPP TS 36.213 Chapter 7.1.7.1), a first HARQ process number HPN1 using for example 3 bits for the first data D1 of the combination COMB1, COMB2, COMB3, COMB4, COMB5, COMB6, a new data indicator NDI using for example 1 bit (transmission is an initial transmission and no retransmission), a first redundancy version RV1 using for example 2 bits for the first data D1 of the combination COMB1, COMB2, COMB3, COMB4, COMB5, COMB6, a TPC command (TPC=Transmission Power Control) for a physical uplink control channel TPCC and an indicator CI for the transmission of the combination COMB1, COMB2, COMB3, COMB4, COMB5, COMB6 using for example 1 bit. The indicator CI may comprise alternatively more than one bit and may indicate in addition to the transmission being a combined transmission a type of the combination such as the combination COMB1 or the combination COMB6.

Physical layer processing parameters of the second data D2 or even further user data may be provided from the base station BS to the mobile station MS via inband signalling (see FIG. 7 b)).

In an alternative, the first HARQ process number HPN1 may further differentiate between HARQ processes of two or more streams, if the radio link RL between the base station BS and the mobile station MS is based on a MIMO channel (MIMO=multiple input multiple output) with two or more parallel streams.

Instead of using the additional indicator CI, in LTE for example, an unused payload combination may be used such as the I_MCS parameter given in 3GPP TS 36.213 comprising for example a value of 29, 30 or 31.

In an even further alternative, the new data indicator NDI may be redefined to indicate a new initial transmission or the transmission of the combination COMB1, COMB2, COMB3, COMB4, COMB5, COMB6, if the combination COMB1, COMB2, COMB3, COMB4, COMB5, COMB6 is permanently applied for the retransmissions and no retransmissions of single user data can happen.

According to an additional alternative (not shown in FIG. 7 a)), the sequence of the control signalling bits on the control channel using for example the downlink scheduling grant of 3GPP LTE may further comprise a parameter indicating the number of user data D1, D2, . . . combined in the combination COMB1, COMB2, COMB3, COMB4, COMB5, COMB6, a weighting factor for performing the addition (see FIG. 5 a)), a second HARQ process number for the second data D2, a second redundancy version for the second data D2, a second modulation and coding scheme for the second data D2, and/or a second transport block size for the second data D2.

Referring to FIG. 7 b) a block diagram of a sequence of inband control signalling bits as part of the combination COMB1, COMB2, COMB3, COMB4, COMB5, COMB6 and encoding and rate matching of the sequence of control signalling bits is shown according to a further alternative embodiment of the invention. Inband means, that the control signalling bits may be multiplexed to the combination COMB1, COMB2, COMB3, COMB4, COMB5, COMB6 of the first and second data D1, D2. The sequence of control signalling bits may comprise a weighting factor WF for performing the addition of the modulated first and second data D1, D2 (see FIG. 5 a)). The sequence of control signalling bits may further comprise a second HARQ process number HPN2 for the second data D2 of the combination COMB1, COMB2, COMB3, COMB4, COMB5, COMB6, a second redundancy version RV2 using for example 2 bits for the second data D2 of the combination COMB1, COMB2, COMB3, COMB4, COMB5, COMB6, a second modulation and/or coding scheme MCS2 using for example 5 bits for the second data D2 of the combination COMB1, COMB2, COMB3, COMB4, COMB5, COMB6 and optionally padding information P and/or CRC information CRC-INFO.

Such sequence of control signalling bits may be used, if physical layer processing parameters of the first data D1 are separately transmitted on a control channel (see FIG. 7 a)).

In a further alternative, the first transport block size TBS1RT of the first data D1 within the combination COMB1, COMB2, COMB3, COMB4, COMB5, COMB6 and a second transport block size TBS2RT of the second data D2 within the combination COMB1, COMB2, COMB3, COMB4, COMB5, COMB6 may be implicitly defined at the base station BS and the mobile station MS by applying at the base station BS a predefined equalization of the first transport block size TBS1RT and the second transport block size TBS2RT with TBS1RT=TBS2RT or by applying at the base station BS a predefined function such as TBS1RT=TBS1T1/(TBS1T1+TBS2T1) and TBS2RT=TBS2T1/(TBS1T1+TBS2T1), wherein TBS1T1 is a transport block size of the first transmission of the first data D1 and TBS2T1 is a transport block size of the first transmission of the second data D2.

In an alternative, the sequence of control signalling bits as part of the combination COMB1, COMB2, COMB3, COMB4, COMB5, COMB6 may comprise a subset of the physical layer processing parameters given above. In a further alternative, the sequence of control signalling bits as part of the combination COMB1, COMB2, COMB3, COMB4, COMB5, COMB6 may further comprise the first modulation and coding scheme MCS1 including the first transport block size TBS1 for the first data D1 of the combination COMB1, COMB2, COMB3, COMB4, COMB5, COMB6, the first HARQ process number HPN1 for the first data D1 of the combination COMB1, COMB2, COMB3, COMB4, COMB5, COMB6, and/or the first redundancy version RV1 for the first data D1 of the combination COMB1, COMB2, COMB3, COMB4, COMB5, COMB6.

In an even further alternative, the sequence of control signalling bits as part of the combination COMB1, COMB2, COMB3, COMB4, COMB5, COMB6 may comprise physical layer processing parameters for a combined retransmission of more than two initial transmissions of user data UD1, UD2, . . . .

The sequence of control signalling bits is error correction coded in an error correction coding step ECE to get codeword bits CB and the codeword bits CB are rate matched for example in a self-decodable way by applying predefined RV parameters (RV=redundancy version) in a rate matching step RM to get error correction coded and rate matched control signalling bits CSIB. Alternatively, the RV parameters and/or a coding scheme for the codeword bits CB may be implicitly defined by using a same coding scheme as applied on a downlink control channel.

The error correction coded and rate matched control signalling bits CSIB may be multiplexed to the combinations COMB1, COMB2, COMB3, COMB4, COMB5, COMB6 as shown in FIGS. 4 and 5.

Some of the physical layer processing parameters such as the scrambling and interleaving scheme may not be changed during a stay of the mobile station MS within the radio cell RC of the base station BS and therefore may predefined at the base station BS and may be predefined at the mobile station MS for example during entering the radio cell RC.

Further physical layer processing parameters such as the first and second HARQ process numbers HPN1, HPN2 may be implicitly defined at the base station BS and the mobile station MS and need not explicitly signalled from the base station BS to the mobile station MS, if for example synchronous HARQ processes are used with a fixed or predefined timing between transmissions, positive or negative acknowledgements and retransmissions. Even so, the error correction coding ECE may be implicitly or pre-defined at the base station BS and the mobile station MS and need not explicitly signalled from the base station BS to the mobile station MS, if the combination COMB1, COMB2, COMB3, COMB4, COMB5, COMB6 use a same coding scheme as applied on a downlink control channel.

Figure 8:
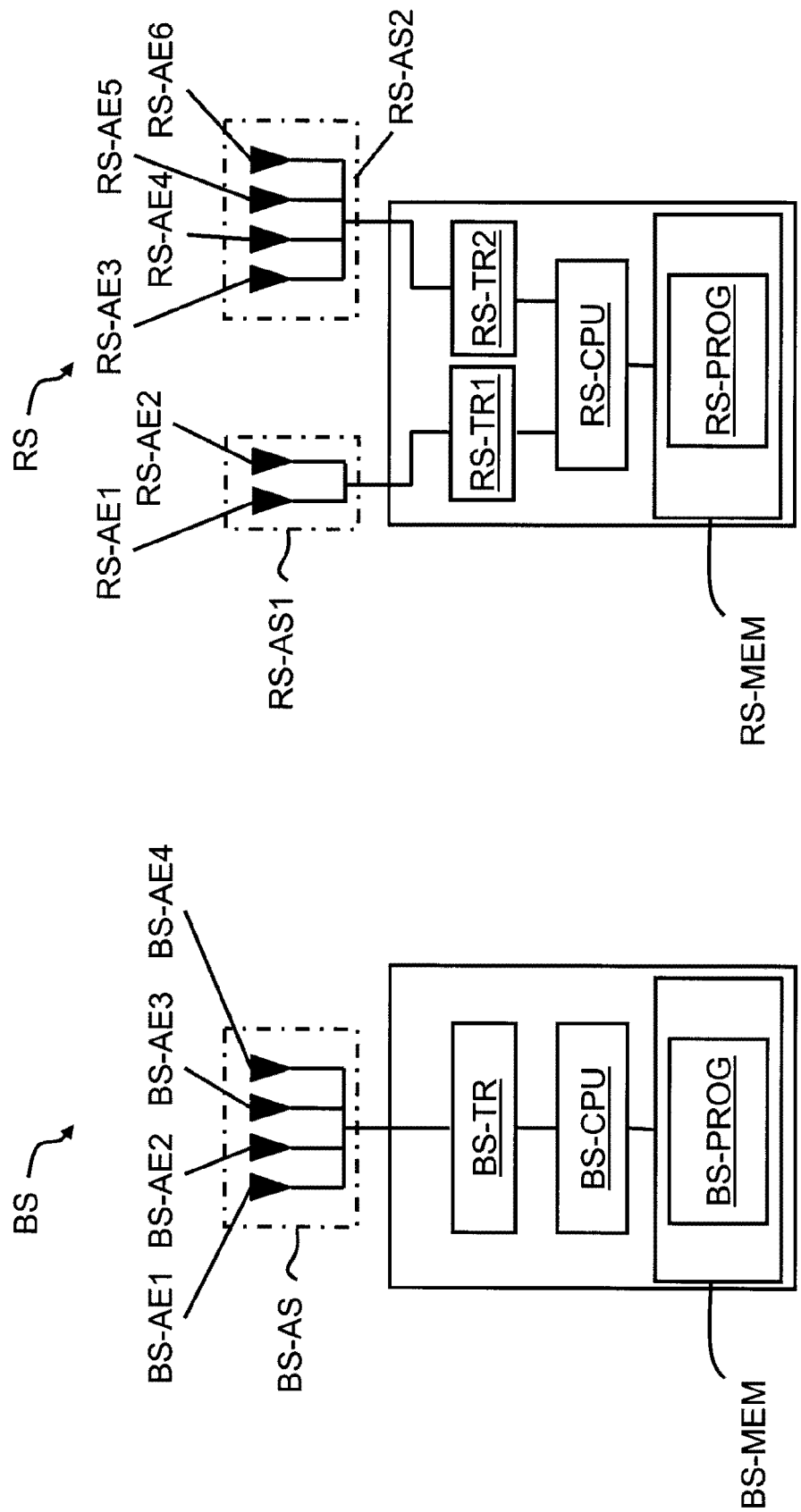
FIG. 8 shows two block diagrams of a base station and a relay station according to the embodiments of the invention.

In case of determining the combination COMB1, COMB2, COMB3, COMB4, COMB5 of the first data D1 and the second data D2 by applying the superposition of the first data D1 and the second data D2 for an uplink transmission from the mobile station MS to the base station BS, the base station BS may signal to the mobile station MS, that the mobile station MS should apply the transmission of the combination COMB1, COMB2, COMB3, COMB4, COMB5, may further signal, which combination type COMB1, COMB2, COMB3, COMB4, COMB5 shall be applied and may even further signal one or several indications for the physical layer processing parameters as shown in FIG. 7 $a$) and/or $b$) such as coding schemes or modulation schemes for the first and the second data D1, D2. Referring to FIG. 8 $a$) the base station BS may comprise an antenna system BS-AS, a transceiver BS-TR, a CPU (CPU=central processing unit) BS-CPU, and a computer readable medium BS-MEM. The CPU BS-CPU and the computer readable medium BS-MEM may be based on a digital baseband board of the base station BS. The CPU BS-CPU is foreseen for executing a computer readable program BS-PROG.

The antenna system BS-AS may comprise a first antenna element BS-AE1, a second antenna element BS-AE2, a third antenna element BS-AE3 and a fourth antenna element BS-AE4 for a wireless coverage area of the radio cell RC. In further alternatives, the antenna system BS-AS may comprise one, two, three or more than four antenna elements.

The transceiver BS-TR transmits the data D1 to D10 (see FIG. 3 $a$)) or D1 to D11 (see FIG. 3 $b$)) as single transmission or as transmissions of the combinations COMB1, COMB2, COMB3, COMB4, COMB5, COMB6 via the antenna system BS-AS to the mobile station MS and receives the positive or negative acknowledgements via the antenna system BS-AS for a downlink communication. In an alternative, a direction of the transmission of messages is reversed for an uplink communication.

The computer readable medium BS-MEM is foreseen for storing the computer readable program BS-PROG. The computer readable program BS-PROG is foreseen for executing steps of the methods MET1 and MET2 belonging to the base station BS.

In particular, the computer readable program BS-PROG may determine the combination COMB1, COMB2, COMB3, COMB4, COMB5 by applying the superposition of the first data D1 and the one or several second data D2 or may determine the combination COMB6 by multiplexing the first and the second data D1, D2 (in case of a downlink transmission) and may recover the first and second data D1, D2 by subtracting an estimate of the first data D1 of at least one previous transmission from an estimate of the combination COMB1, COMB2, COMB3, COMB4, COMB5 and by subtracting the second data D2 from the estimate of the combination COMB1, COMB2, COMB3, COMB4, COMB5 or may recover the first and second data D1, D2 by demultiplexing the first and the second data D1, D2 from the combination COMB6 (in case of an uplink transmission).

Referring to FIG. 8 $b$) the relay station RS may comprise a first antenna system RS-AS1, a first transceiver RS-TR1, a second antenna system RS-AS2, a second transceiver RS-TR2, a CPU RS-CPU, and a computer readable medium RS-MEM. The CPU RS-CPU and the computer readable medium RS-MEM may be based on a digital baseband board of the relay station RS. The CPU RS-CPU is foreseen for executing a computer readable program RS-PROG.

The first antenna system RS-AS1 may comprise a first antenna element RS-AE1 and a second antenna element RS-AE2. In further alternatives, the first antenna system RS-AS1 may comprise one or more than two antenna elements.

The first transceiver RS-TR1 transmits the data D1 to D10 (see FIG. 3 $a$)) or D1 to D11 (see FIG. 3 $b$)) as single transmissions or as transmissions of the combinations COMB1, COMB2, COMB3, COMB4, COMB5, COMB6 via the first antenna system RS-AS1 to the base station BS and receives the positive or negative acknowledgements via the first antenna system RS-AS1 for an uplink communication between the mobile station MS and the base station BS via the relay station RS. In an alternative, a direction of the transmission of messages is reversed for a downlink communication.

The second transceiver RS-TR2 transmits the data D1 to D10 (see FIG. 3$a$)) or D1 to D11 (see FIG. 3 $b$)) as single transmissions or as transmissions of the combinations COMB1, COMB2, COMB3, COMB4, COMB5, COMB6 via the second antenna system RS-AS2 to the mobile station MS and receives the positive or negative acknowledgements via the second antenna system RS-AS2 for a downlink communication between the base station BS and the mobile station MS via the relay station RS. In an alternative, a direction of the transmission of messages is reversed for an uplink communication.

The computer readable medium RS-MEM is foreseen for storing the computer readable program RS-PROG. The computer readable program RS-PROG is foreseen for executing steps of the methods MET1 and MET2 belonging to the relay station RS.

In particular, the computer readable program RS-PROG may determine the combination COMB1, COMB2, COMB3, COMB4, COMB5 by applying the superposition of the first data D1 and the one or several second data D2 or may determine the combination COMB6 by multiplexing the first and the second data D1, D2 (in case of a transmission from the relay station RS to the mobile station MS or the base station BS) and may recover the first and second data D1, D2 by subtracting an estimate of the first data D1 of at least one previous transmission from an estimate of the combination COMB1, COMB2, COMB3, COMB4, COMB5 and by subtracting the second data D2 from the estimate of the combination COMB1, COMB2, COMB3, COMB4, COMB5 or may recover the first and second data D1, D2 by demultiplexing the first and the second data D1, D2 from the combination COMB6 (in case of a transmission from the mobile station MS or the base station BS to the relay station RS).

Figure 9:
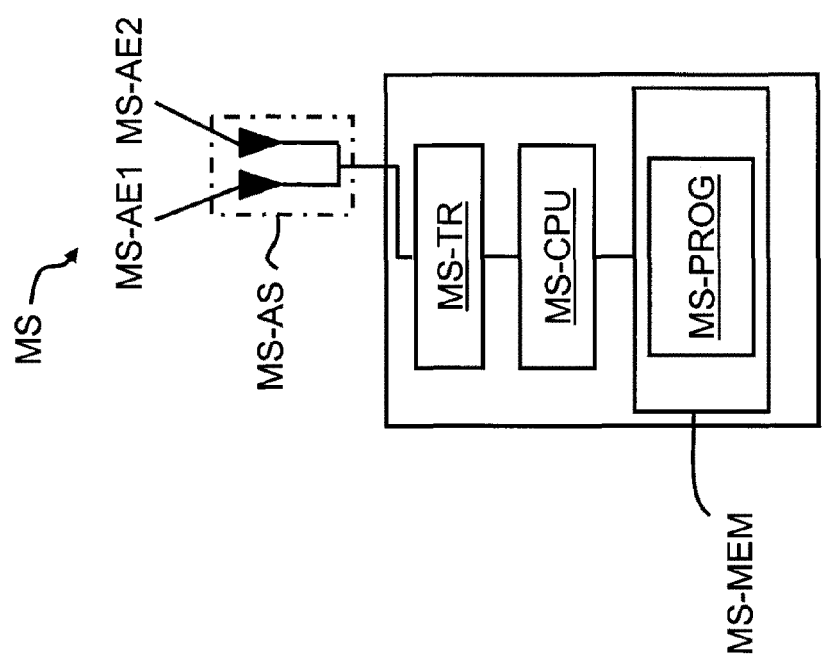
FIG. 9 shows a block diagram of a mobile station according to the embodiments of the invention.

Referring to FIG. 9 a mobile station MS comprises an antenna system MS-AS, a transceiver MS-TR, a CPU (CPU=central processing unit) MS-CPU, and a computer readable medium MS-MEM. The CPU MS-CPU and the computer readable medium MS-MEM may be based on a digital baseband board of the mobile station MS. The CPU MS-CPU is foreseen for executing a computer readable program MS-PROG.

The antenna system MS-AS may comprise a first antenna element MS-AE1 and a second antenna element MS-AE2. Alternatively, the antenna system MS-AS may comprise one antenna element or more than two antenna elements.

The transceiver MS-TR receives the data UD1 to UD10 (see FIG. 3 $a$)) or the data UD1 to UD11 (see FIG. 3 $b$)) as single transmissions or as transmissions of the combinations COMB1, COMB2, COMB3, COMB4, COMB5, COMB6 via the antenna system MS-AS from the base station BS or the relay station RS and transmits the positive or negative acknowledgements via the antenna system MS-AS for a downlink communication. In an alternative, a direction of the transmission of messages is reversed for an uplink communication.

The computer readable medium MS-MEM is foreseen for storing the computer readable program MS-PROG. The computer readable program MS-PROG is foreseen for executing steps of the methods MET1 and MET2 belonging to the mobile station MS.

In particular, the computer readable program RS-PROG may recover the first and second data D1, D2 by subtracting an estimate of the first data D1 of at least one previous transmission from an estimate of the combination COMB1, COMB2, COMB3, COMB4, COMB5 and by subtracting the second data D2 from the estimate of the combination COMB1, COMB2, COMB3, COMB4, COMB5 or may recover the first and second data D1, D2 by demultiplexing the first and the second data D1, D2 from the combination COMB6 (in case of an downlink transmission) or may determine the combination COMB1, COMB2, COMB3, COMB4, COMB5 by applying the superposition of the first data D1 and the one or several second data D2 or may determine the combination COMB6 by multiplexing the first and the second data D1, D2 (in case of a uplink transmission).

The invention claimed is:

1. A method for transmitting data from a first network node of a radio access network of a radio communication system to a second network node of the radio access network, said method comprising:
   receiving a first negative acknowledgement from the second network node, indicating that the second network node cannot recover error free first data, the first data being data from a single data source of the radio access network or for a single data sink of the radio access network,
   determining a combination of the first data and of at least second data by applying a superposition of the first data and the at least second data, the at least second data being further data from the single data source or for the single data sink, and
   transmitting the combination to the second network node, wherein said at least second data comprises data for which a second negative acknowledgement has been received from the second network node, wherein the method further comprises switching between the combination being the superposition of the first data and the at least second data and a combination being determined by multiplexing the first data with the at least second data and the method further comprises switching between the transmission of the combination and a single retransmission for the first data.

2. The method according to claim 1, wherein the determining for the combination is applied, if the first negative acknowledgement and the at least one second negative acknowledgement are transmitted to the second network node within a predefined time interval and wherein an indication for the transmission of the combination is implicitly provided to the second network node by transmitting the first negative acknowledgement and the at least one second negative acknowledgement within the predefined time interval.

3. The method according to claim 1, wherein the method further comprises switching between the combination being a retransmission for the first user data and the at least second user data and the combination being the retransmission for the first data and the first transmission for the at least second data.

4. The method according to claim 3, wherein said switching depends on a fill level of a buffer at the first network node, depending on a number of negative acknowledgements received previously and/or depending on current radio link quality.

5. The method according to claim 3, wherein the superposition is a modulo 2 addition of the first data and the at least second data prior to modulation or the superposition is an addition of real amplitude values of the first data and the at least second data and an addition of imaginary amplitude values of the first data and the at least second data after the modulation and wherein the first data and the at least second data are modulated with a same modulation scheme or with different modulation schemes.

6. The method according to claim 1, wherein the method further comprises multiplexing at least one physical layer processing parameter of the first data and/or the at least second data to the combination.

7. The method according to claim 6, wherein the method further comprises applying or adapting the transmission of the combination depending on a quality of service class of the first data and the at least second data.

8. The method according to claim 7, wherein the method further comprises providing an indication for the transmission of the combination by the first network node to the second network node and wherein the transmission of the combination is provided by a third network node of the radio communication system.

9. The method according to claim 7, wherein the single data source is the first network node or a third network node of the radio access network or the single data sink is the second network node or the third network node.

10. The method according to claim 1, wherein said method further comprises receiving a single positive or negative acknowledgement for said received combination from said second network node at said first network node, if said first data and said at least second data could or could not be recovered error free.

11. The method according to claim 10, wherein said negative acknowledgement for said received combination comprises an indicator indicating a quality of reception at said second network node.

12. A first network node for use in a radio access network of a radio communication system, said first network node comprising:
   a receiver configured to receive a first negative acknowledgement, if a second network node cannot recover first data error free, the first data being data from a single data source of the radio access network or for a single data sink of the radio access network,
   a processor configured to determine a combination of the first data and of at least second data by applying a superposition of the first data and the at least second data, the at least second data being further data from the single data source or for the single data sink, and
   a transmitter configured to transmit the combination,
   wherein said at least second data comprises data for which a second negative acknowledgement has been received from the second network node, wherein the first network node further comprises a switch configured to switch between the combination being the superposition of the first data and the at least second data and a combination being determined by multiplexing the first data with the at least second data and switch between the transmission of the combination and a single retransmission for the first data.

13. The first network node according to claim 12, wherein the first network node is a base station, a relay station or a mobile station.

14. A method for transmitting data from a first network node of a radio access network of a radio communication system to a second network node of the radio access network, said method comprising:
- transmitting a first negative acknowledgement from the second network node, if the second network node cannot recover error free first data, the first data being data from a single data source of the radio access network or for a single data sink of the radio access network;
- determining a combination of the first data and of at least second data by applying a superposition of the first data and the at least second data, the at least second data being further data from the single data source or for the single data sink, wherein the superposition is a modulo 2 addition of the first data and the at least second data prior to modulation or the superposition is an addition of real amplitude values of the first data and the at least second data and an addition of imaginary amplitude values of the first data and the at least second data after the modulation and wherein the first data and the at least second data are modulated with a same modulation scheme or with different modulation schemes;
- transmitting the combination to the second network node, wherein said at least second data comprises data for which a second negative acknowledgement has been received from the second network node;
- recovering the at least second data at the second network node by subtracting an estimate of the first data of at least one previous transmission from an estimate of the combination;
- recovering the first data at the second network node by subtracting an estimate of the at least second data of at least one previous transmission from the estimate of the combination;
- switching between the combination being a retransmission for the first user data and the at least second user data and the combination being the retransmission for the first data and the first transmission for the at least second data.

15. The method according to claim 14, wherein the determining for the combination is applied, if the first negative acknowledgement and the at least one second negative acknowledgement are transmitted from the second network node within a predefined time interval and wherein an indication for the transmission of the combination is implicitly provided to the second network node by transmitting the first negative acknowledgement and the at least one second negative acknowledgement within the predefined time interval.

16. The method according to claim 14, wherein said switching depends on a fill level of a buffer at the first network node, depending on a number of negative acknowledgements received previously and/or depending on current radio link quality.

* * * * *